United States Patent
Darlington et al.

(10) Patent No.: US 11,280,067 B2
(45) Date of Patent: Mar. 22, 2022

(54) ATTACHMENT STATUS MONITORING OF GROUND ENGAGING TOOLS (GET) AT HEAVY MACHINERY

(71) Applicant: SANDVIK INTELLECTUAL PROPERTY AB, Sandviken (SE)

(72) Inventors: Bradley Darlington, Wellard (AU); Bruce Knowles, Roleystone (AU); Paul Schild, Perth (AU); Bradley Dallard, Leeming (AU)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 318 days.

(21) Appl. No.: 16/464,236

(22) PCT Filed: Nov. 25, 2016

(86) PCT No.: PCT/EP2016/078841
§ 371 (c)(1),
(2) Date: May 24, 2019

(87) PCT Pub. No.: WO2018/095536
PCT Pub. Date: May 31, 2018

(65) Prior Publication Data
US 2019/0284784 A1 Sep. 19, 2019

(51) Int. Cl.
*E02F 9/26* (2006.01)
*E02F 9/28* (2006.01)
*G06K 7/10* (2006.01)
*G07C 5/08* (2006.01)
(Continued)

(52) U.S. Cl.
CPC .............. *E02F 9/264* (2013.01); *E02F 9/267* (2013.01); *E02F 9/2808* (2013.01);
(Continued)

(58) Field of Classification Search
CPC ......... E02F 9/264; E02F 9/267; E02F 9/2808; G06K 7/10009; G07C 3/08; G07C 5/0825;
(Continued)

(56) References Cited

U.S. PATENT DOCUMENTS

| 6,061,617 A | 5/2000 | Berger et al. |
| 2003/0112153 A1 | 6/2003 | Lujan et al. |

(Continued)

FOREIGN PATENT DOCUMENTS

| CN | 204001039 U2 | 12/2014 |
| WO | 2010065990 A1 | 6/2010 |

(Continued)

*Primary Examiner* — Sisay Yacob
(74) *Attorney, Agent, or Firm* — Corinne R. Gorski

(57) ABSTRACT

A system for monitoring a status of attachment of a ground engaging tool (GET) at a mining, earth moving or rock processing machine. The system includes providing GET with at least one proximity sensor configured to sense a proximity of the GET relative to a mount region of heavy machinery to which the GET is mountable. The proximity sensor is configured to generate proximity data that is transmitted from the GET via a wireless communication pathway to a receiver located remote from the GET with the receiver configured to output in real-time the attachment status of the GET. The present system is advantageous to identify partial detachment or loosening of a GET so as to prevent undesirable GET loss and contamination of extracted or processed raw material.

20 Claims, 16 Drawing Sheets

(51) Int. Cl.
    *H04Q 9/00* (2006.01)
    *G07C 3/08* (2006.01)
(52) U.S. Cl.
    CPC ........... *G06K 7/10009* (2013.01); *G07C 3/08* (2013.01); *G07C 5/0825* (2013.01); *H04Q 9/00* (2013.01); *H04Q 2209/40* (2013.01); *H04Q 2209/47* (2013.01)
(58) Field of Classification Search
    CPC ... H04Q 2209/40; H04Q 2209/47; H04Q 9/00
    See application file for complete search history.

(56) References Cited

U.S. PATENT DOCUMENTS

| | | | |
|---|---|---|---|
| 2013/0049935 A1 | 2/2013 | Miller | |
| 2013/0082846 A1 | 4/2013 | Mckinley | |
| 2014/0311762 A1* | 10/2014 | Behmlander | E02F 3/8152 172/430 |
| 2015/0149049 A1* | 5/2015 | Bewley | E02F 9/267 701/50 |
| 2015/0211214 A1* | 7/2015 | Dallard | E02F 9/2833 37/456 |
| 2015/0284935 A1 | 10/2015 | Egger et al. | |
| 2016/0237657 A1* | 8/2016 | Carpenter | E02F 9/26 |
| 2016/0326723 A1 | 11/2016 | Behmlander et al. | |

FOREIGN PATENT DOCUMENTS

| | | |
|---|---|---|
| WO | 2012107848 A1 | 8/2012 |
| WO | 2012116408 A1 | 9/2012 |
| WO | 2014037780 A1 | 3/2014 |

* cited by examiner

ATTACHMENT STATUS MONITORING OF GROUND ENGAGING TOOLS (GET) AT HEAVY MACHINERY

RELATED APPLICATION DATA

This application is a § 371 National Stage Application of PCT International Application No. PCT/EP2016/078841 filed Nov. 25, 2016.

FIELD OF INVENTION

The present invention relates to the status monitoring of ground engaging tools (GETs) attached to heavy machinery such as a bucket of an underground loader and in particular, although not exclusively, to an electronic monitoring and communication system to prevent undesirable detachment and loss of GETs during use.

BACKGROUND ART

Underground mining machines operate in challenging environments and are typically subjected to significant forces and stress. Accordingly, such mining machines comprise replaceable wear parts that may be optimised for durability and are capable of being replaced when warned or damaged. For example, typically a bucket of an underground loader is fitted with a plurality of GETs in the form or interchangeable teeth secured to the front lip or edge of the bucket. Initially, the GETs were welded onto the bucket lip and on expiry of their service lifetime, removal from the lip was achieved via a time and labour intensive cutting process.

More recently, mechanical connection systems have been proposed to facilitate the interchange of warn GETs as described in WO 2010/065990 and WO 2014/037780. However, it is not uncommon for existing mechanical connections to wear prematurely or be damaged due to high impact loading forces resulting in detachment of a GET. In such situations, normal operation is halted as a manual search is often undertaken to try and locate the lost GET. Additionally, further time and effort is required to reattach or install a new GET at the heavy machinery.

A particular problem with lost and unidentified GETs is the contamination of the bulk material that is being extracted and subsequently processed (by a crusher for example). As will be appreciated, the introduction of an uncrushable GET into a crusher can cause significant damage and machine downtime. Accordingly, systems have been proposed for the detection of detached GETs to try and prevent disruption to downstream material processing. In particular, WO 2012/116408 describes a detection system for detecting loss of a GET component from a mining or earth moving machine. The system comprises a radio frequency identification (RFID) tag securable to the GET component. One or more tag reading stations are provided at exit gates surrounding the site such that GET contaminated bulk material passing through a gate is scanned to allow GET identification and removal prior to onward processing. Further example GET detection systems are described in US 2013/0049935; US 2003/0112153; US 2015/0149049; WO 2012/107848 and CN 204001039.

However, existing GET detection systems are limited to the detection of detached GETs. In particular, a GET embedded deeply within extracted bulk material may not be readily identifiable and may pass downstream undetected. Additionally, such systems do not address the problem of the labour and time required to repair and/or reattach a lost GET at the heavy machinery. Accordingly, what is required is a GET detection/monitoring system that addresses the above problems.

SUMMARY OF THE INVENTION

It is an objective of the present invention to provide a monitoring system for monitoring a status of attachment of a ground engaging tool (GET) at a mining, earth moving or rock processing machine configured to output a status of attachment of the GET at the heavy machinery in real-time (i.e., as the machinery is in use). It is a further specific objective to provide a monitoring system that is sensitive to the attachment status of a GET so as to alert personnel to the loosening or partial failure of a mechanical connection of the GET to the heavy machinery. Accordingly, it is a general objective of the present invention to provide a system to avoid undesirable damage to the attachment mechanism of a GET and the unintentional GET detachment at a mining, earth moving or rock processing machine.

The objectives are achieved by providing a GET attachment status monitoring system in which a proximity sensor is provided at the GET and is configured to sense a proximity of a GET relative to a region of the mining, earth moving or rock processing machine to which the GET is mounted. Such a sensor is configured to transmit real-time data to a suitable receiver so as to provide live connection status monitoring. Such status monitoring may be qualitative or quantitative relative to a predetermined and desirable connection status. The subject invention may be implemented via RFID type technology in which an RFID tag coupled to a GET is capable of transmitting sensor data to a receiver for direct output to personnel and/or onward communication to a network or central hub.

The present system may be configured as a local network or localised GET attachment status monitoring system specific to a particular machine such as an underground loader. In particular, a set of GETs mounted at a lip of a loader bucket may be respectively paired with a single receiver mountable in the cab of the loader with each GET comprising an RFID tag capable of single or two way communications with the cab mounted receiver. Pairing of the receiver and tags (implemented for example by password or code communication) is advantageous in that each individual loader machine comprises a 'self-contained' GET connection status monitoring system that is independent of other operating machines within the same environment. This type of machine specific local network configuration is advantageous to optimise the sensitivity of the monitoring/detection system and to provide a reliable and efficient system with regard to the working components, their function and communication pathways.

The subject invention is further advantageous via the configuration of the machine/localised GET monitoring system in that each system is capable of being configured to be sensitive to detached GETs of other machines if required. That is, by configuration of the machine specific receivers of a plurality of machines, multiple machines can be configured to be sensitive to detached GETs of neighbouring machines and increase the likelihood of recovery. The present invention may be advantageously implemented using RFID type technology in which individual GETs are capable of transmitting status sensor data via wireless communication to an electronic receiver within desired and optimised radio frequency ranges fitting with a working environment such as a mine.

According to a first aspect of the present invention there is provided a monitoring system for monitoring a status of attachment of a ground engaging tool (GET) at a mining, earth moving or rock processing machine, the system comprising: at least one GET detachably mountable at a mount region of a mining, earth moving or rock processing machine; at least one proximity sensor provided at the GET and configured to sense a proximity of the GET relative to the mount region of the mining, earth moving or rock processing machine to which the GET is mountable; and a transmitter provided at the GET to transmit wirelessly proximity data to a receiver located remote from the GET.

Optionally, the GET comprises a first part of a mechanical connection and the mount region comprises a second part of the mechanical connection, the GET capable of being detachably mounted at the mount region via a mating of the first part and the second part. The first part may comprise a generally solid body having an internal cavity region that defines a 'shroud' capable of at least partially extending over the mount region. The second part may comprise a boss, body or projection capable of being received within the cavity or shroud. The first part and second part may be mated together via a mechanical connection mechanism as described in WO 2014/037780 the contents of which are incorporated herein by reference. Such a mechanical connection is advantageous to allow convenient mounting and interchange of GETs at the mount region.

Optionally, the proximity sensor comprises any one or a combination of the following set of: an inductor component; a capacitor component; a proximity sensor component. Preferably, the inductor component comprises an inductance sensor that may include electronic components such as at least one capacitor, at least one inductor, at least one proximity sensor and/or a load cell or strain gauge configured to measure strain at a GET. Where the sensor comprises a strain gauge, the subject invention is capable of outputting a calculated stress based on stain monitoring.

Preferably, the GET comprises an electronic tag, wherein the proximity sensor is provided at the tag. Preferably, the tag comprises any one or a combination of the following set of: a PCB; a processor; a data storage utility; a transceiver; an antenna. Optionally, the transceiver comprises a radio frequency transceiver and/or a Bluetooth transceiver. Preferably, the present system utilises RFID tag technology to provide a system adaptable to suit different working environments with regard to operating frequency and range of frequency transmission.

Preferably, the system further comprises an activator having a PCB, a processor and a transceiver, the activator configured for wireless communication with the electronic tag. Preferably, the activator is a hand-held device capable of being located in close proximity to the electronic tag so as to activate the tag for use and in particular to convert the tag from an initial 'manufacturing mode' to a fully functional 'operational mode'. Preferably, the activator and the electronic tag are configured for UHF (radio frequency) and/or Bluetooth communication. Preferably, the activator is configured for wired or wireless communication with auxiliary computer entities such as a computer, personal digital assistant (PDA) and the like. Preferably, the activator is configured to receive data via Bluetooth communication and then to transmit data to the tag via UHF communication. Optionally, the electronic tag may be configured for any mode of wired or wireless communication. Such wireless communication may include any type of electromagnetic wireless technology encompassing radio frequency and other types of communication such as long-term evolution (LTE), LTE-advanced, Wi-Fi and Bluetooth. The tag may also operate with radio frequency communication technology including any of the ITU radio bands for example VLF, LF, MF, HF, VHF, UHF, SHF, EHF or THF. Accordingly, where the present invention comprises a receiver and optionally an activator, such components may be similarly configured for these types of wireless communication via their electronic components and in particular their communication components such as transceivers.

Optionally, the activator may be an auxiliary computer entity such as a computer, PDA, a mobile phone and the like. Optionally, the activator may be an electronic component positionable in the communication pathway intermediate the GET (tag) and an auxiliary computer entity such as a PDA.

Preferably, the electronic tag is encapsulated within a housing, a shell, an encapsulating material or specifically a polymer based material so as to protect the tag from abrasive wear or impact related damage and to provide a sealed coating to prevent moisture ingress. Optionally, the polymer based material comprises a silicone material or an epoxy adapted to seal, house and protect the electronic components from moisture in addition to bonding the tag to the GET.

Preferably, the receiver comprises a PCB, a processor, a transceiver and a data storage utility. More preferably, the receiver further comprises an accelerometer, a display screen and an antenna. The receiver may further comprise additional electronic components to provide wired or wireless communication between the receiver and other components of a larger network or computer entities such as a server, computer, PDA etc. Preferably, the receiver further comprises a user interface comprising a display screen to output the proximity data (or information based on the proximity data) and optionally additional sensor data or information based on one of the sensors mounted at the machine. Such sensor data may include accelerometer data including in particular accelerometer data relating to part of the machine to which a GET is mounted including movement in elevation, horizontal/vertical motion, angular rotation and acceleration or deceleration of a machine part to which the GET is attached. In particular, the user interface (or display screen) is configured to output an angular orientation of a GET corresponding to an inclination or declination of a machine part to which a GET is attached.

Optionally, the mount region is a leading edge of an excavation bucket of an earth moving machine. Optionally, the mount region is a region of a hammer component, a drill component, a crushing component forming part of a mining, quarrying, rock processing or crushing apparatus. Optionally, the status monitoring tag according to the subject invention may be mounted at any region or component of ground engaging or rock processing apparatus including for example mounting at an excavation bucket, a vehicle, a motor, a gear box, a hopper, a conveyor, a protective liner, a wear plate, a crushing shell, a drill rod, a drill shank adaptor, a drill head, a drive sub, a drill casing or other intermediate drill component forming part of a drill string.

Optionally, the GET further comprises any one or a combination of the following set of: a temperature sensor; a GET wear status sensor; an accelerometer; a voltage sensor. Optionally, the wear status sensor comprises a resistive wire or film capable of being fully or at least partially embedded within the GET. Optionally, the wear status sensor comprises a resistance wire or foil extending through the body of the GET from external facing surface to an internal region or internal facing surface (i.e., at a cavity region of the GET). Optionally, the wear status sensor may comprise an ultrasonic sensor configured to identify a relative thickness and/or body profile of a GET to allow determination of a wear status. Such an ultrasonic sensor may be operated according to time periods being independent of the operation of other sensors so as to provide power saving. Optionally, the ultrasonic sensor may be operated in a period twice a day, once a day or once every two or three days. Such a configuration is advantageous to provide wear status data as the volume of material that forms the GET is reduced, as the GET wears during normal use.

According to a second aspect of the present invention there is provided a method of monitoring a status of attachment of a ground engaging tool (GET) at a mining, earth moving or rock processing machine, the method comprising: providing a proximity sensor at a GET detachably mountable at the mining, earth moving or rock processing machine; sensing the proximity of the GET relative to a mount region of the mining, earth moving or rock processing machine to which GET is mounted; transmitting wirelessly proximity data generated by the sensor to a receiver located remote from the GET; and storing, outputting and/or processing the proximity data at the receiver to monitor the attachment status of the GET based on the proximity data.

Preferably, the system further comprises outputting at the receiver the proximity data or information based on the proximity data. Optionally, the proximity data may be transmitted to the receiver according to single or multiple sensing events of the order of one event per millisecond, per second or per minute. Optionally, the system is configured such that sensor data is transmitted to the receiver in a range one to five times a second to one to five times every thirty seconds. Optionally, the sensor is configured to generate proximity sensor data in a range one event per second to one event per ten seconds.

Preferably, the electronic tag is configured to transmit tag ID data to the receiver such that the electronic tag and the receiver are communication paired; wherein in a normal use mode, the receiver accepts exclusively transmission of proximity data from the electronic tag associated with the mining, earth moving or rock processing machine and not from non-associated electronic tags on different mining, earth moving or rock processing machines. Reference within the specification to 'communication paired' encompasses pass-code or password related data transmission such that data from the sensor is received and processed, stored or output at the receiver only if the sensor data is accompanied by a recognised tag ID data that confirms the electronic tag is associated with a GET at the mining, earth moving or rock processing machine that is within the designated 'local network' of the mining, earth moving or rock processing machine with such a network comprising at least one GET and a communication paired receiver. Preferably, and in one implementation, the communication pairing between the electronic tag and the receiver is achieved via a lock and key code based system in which each data packet transmitted from a GET includes code data that is recognised by the receiver.

Preferably, the method further comprises prior to generating the proximity data, activating the electronic tag using an activator configured for wireless communication with the electronic tag. Preferably, the wireless communication between the activator and the electronic tag is Bluetooth or UHF communication. Optionally, the wireless communication with the tag utilises adaptive frequency hopping (AFH) to provide low energy communication and a means of avoiding or minimising communication interference.

Optionally, the step of activating the electronic tag comprises transferring activation data to the electronic tag, the activation data comprising any one or a combination of the following set of: ID data relating to the GET, the environment within which the GET is to be operative and/or the machine to which the GET is mountable; a position of the GET at the machine to which the GET is mounted; communication parameter data to enable the electronic tag to communicate with the receiver; configuration data to set a working configuration of the electronic tag. Such data exchange may comprise wireless or wired communication between an electronic tag, an activator and/or a third data storage or transmission component such as a computer, a network, a cloud architecture, a hub, a PDA.

Preferably, the method further comprises providing at the GET any one or a combination of the following set of: a temperature sensor; a GET wear status sensor; an accelerometer; a voltage sensor; and sensing at the GET and transmitting to the receiver any one or a combination of the following set of: a temperature of the GET; a wear status of the GET; an inclination/declination of the GET; an acceleration/deceleration of the GET; a tilt angle of the GET; GET movement in a horizontal/vertical plane; a strain or stress at the GET; an impact status of a GET; a voltage at any one or a combination of the sensors.

Preferably, the method further comprises outputting the proximity data or information based on the proximity data to a network or data storage utility such as a cloud architecture via wired or wireless communication. Preferably, the proximity data is processed by the processor on board the receiver such that the system comprises raw proximity data and processed proximity data with the processed proximity data preferably being output at the receiver. The output proximity data may be expressed visually, audibly or tactilely. Preferably the data is output graphically and/or numerically indicating a status of attachment of the GET at the machine.

Preferably, the method is further configured such that in response to a mechanical detachment of the GET from the mount region, the receiver is configured to transmit to at least one neighbouring receiver (in the same working environment) a signal to enable said neighbouring receiver(s) to receive and process a signal transmitted from the GET that is detached. Preferably, the neighbouring receivers are configured to communicate with the receiver of the machine from which the GET has been detached and to notify the receiver when a signal has been received from the detached GET. Such a system is advantageous to identify and locate a detached GET as quickly as possible by utilising neighbouring machines to receive data from the detached GET. Such a system is described herein with reference to the generation of an SOS signal and process.

According to a further aspect of the present invention there is provided a monitoring system for monitoring a status characteristic of each of a set of ground engaging tools (GETs) mountable at a mining, earth moving or rock processing machine, the system comprising: a plurality of GETs mountable to respective mount regions of a mining, earth moving or rock processing machine; a set of RFID tags, each tag having at least one sensor for sensing a status characteristic of each respective GET; a receiver to receive data from the RFID tags; each of the RFID tags comprising ID data to associate the RFID tags with a specific mining, earth moving or rock processing machine; wherein the receiver and the RFID tags are configured to be communication paired such that in a normal use mode said receiver accepts exclusively data transmission from said RFID tags associated with said mining, earth moving or rock processing machine and not from non-associated RFID tags.

According to a further aspect of the present invention there is provided a method of monitoring a status characteristic of each of a set of ground engaging tools (GETs) mountable at a mining, earth moving or rock processing machine, the method comprising: providing a plurality of GETs mountable to respective mount regions of a mining, earth moving or rock processing machine; providing each GET of the set of GETs with an RFID tag, each having at least one sensor; sensing a status characteristic of each of the GETs via each respective sensor; each RFID tag transmitting GET status data to a receiver that is communication paired with the RFID tags so as to receive GET status data from said RFID tags and to ignore data from non-communication paired RFID tags in a normal use mode.

According to a further aspect of the present invention there is provided a monitoring system for monitoring a status characteristic of a ground engaging tool (GET) at a mining, earth moving or rock processing machine, the system comprising: a GET mechanically attachable to a mount region of the mining, earth moving or rock processing machine; at least one tag provided at the GET, the tag having at least one sensor, a processor and a transmitter to transmit wireless GET status data based on signals generated by the sensor; a receiver configured to receive wirelessly the GET status data from the tag; at least the tag comprising ID data to associate the tags with the receiver such that the receiver and the tag are communication paired and the receiver is configured to receive exclusively in normal use GET status data from the tag having a recognised ID and to ignore GET status data from other tags.

Reference within this specification to 'a status characteristic' of a GET encompasses a temperature of the GET; a wear status of the GET; movement of the GET; movement of the GET in a horizontal/vertical plane; an inclination/declination of the GET; an acceleration/deceleration of the GET; a tilt angle of the GET; a strain or stress at the GET; an impact status of a GET; a voltage through a sensor at an electronic tag provided at a GET and/or any other physical or mechanical characteristic.

According to a further aspect of the present invention there is provided a ground engaging tool (GET) mountable at a mining, earth moving or rock processing machine, the GET comprising: a main body having a ground engaging region to engage the ground and an attachment region to attach the GET at a mining, earth moving or rock processing machine; an RFID tag attached to the GET, the tag comprising: a PCB; a processor; an antenna; a battery; at least one sensor comprising a proximity sensor to sense a proximity of the GET relative to a region of the mining, earth moving or rock processing machine to which the GET is mountable.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
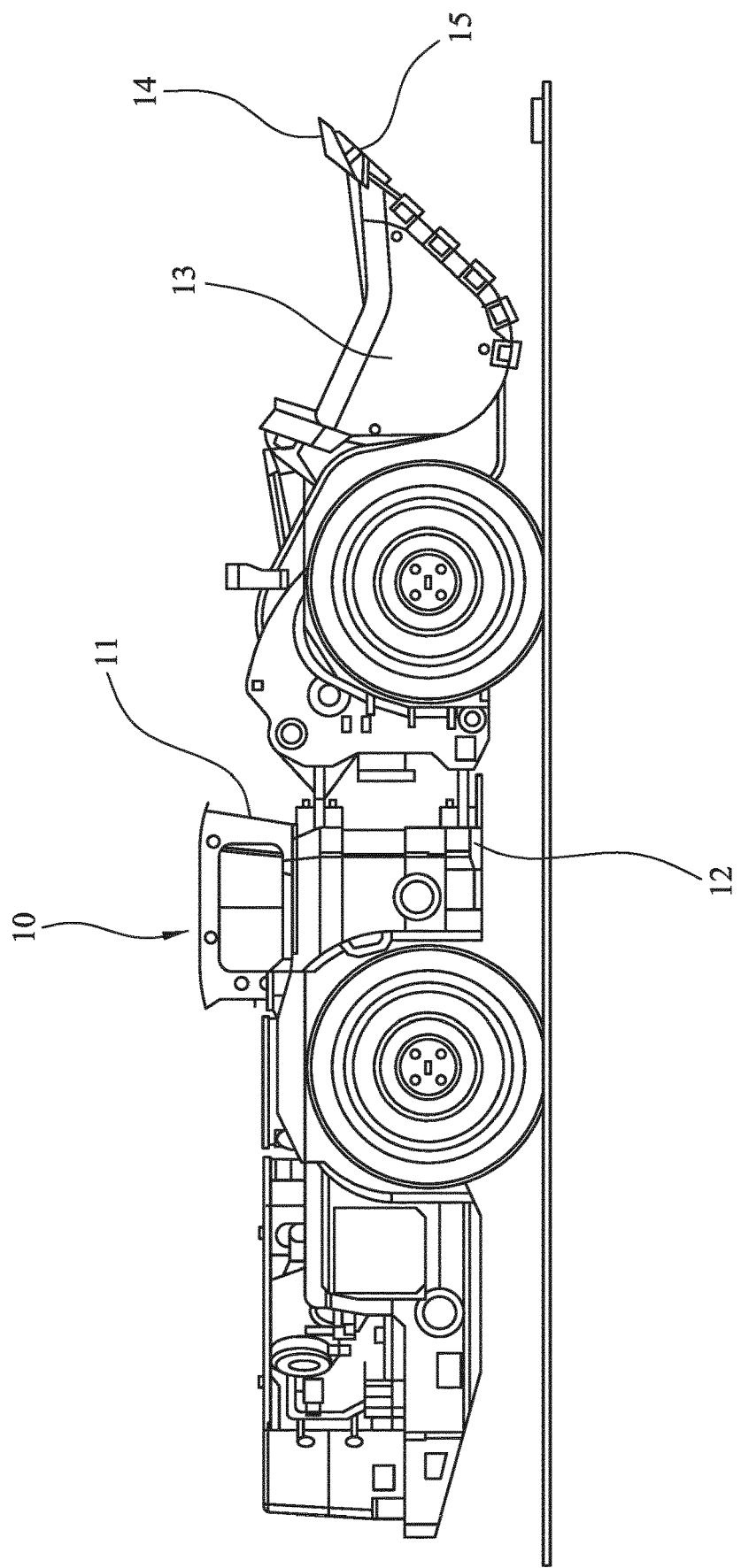
FIG. 1 is a side elevation view of a mining machine underground loader comprising an excavation bucket mounting a plurality of ground engaging teeth (GETs)

The subject invention provides a system enabling the active monitoring of the mechanical connection of a wear part to heavy machinery so as to detect in real-time any loosening, partial or complete detachment of the wear part from its region of attachment. The subject invention accordingly provides apparatus and method focused towards preventing undesirable detachment and loss of wear parts in an environment such as a mine or quarry. The subject invention seeks to avoid the disadvantages associated with such undesirable detachment including in particular damage to downstream processing apparatus and the time and effort needed to locate lost wear parts. One implementation of the subject invention may exemplified via the configuration of an underground mining loader, commonly referred to as a load haul dumper (LHD) 10. The loader 10 comprises a mainframe or chassis 12, an operated cab 11 and a pivot mounted excavator bucket 13 that in turn mounts a plurality of ground engaging teeth (GETs) 14 attached respectively to a leading edge or lip 15 of the bucket 13. As will be appreciated, the loader 10 is independently powered by a motor unit so as to be a mobile unit operative autonomously within an underground mine environment.

Figure 2:
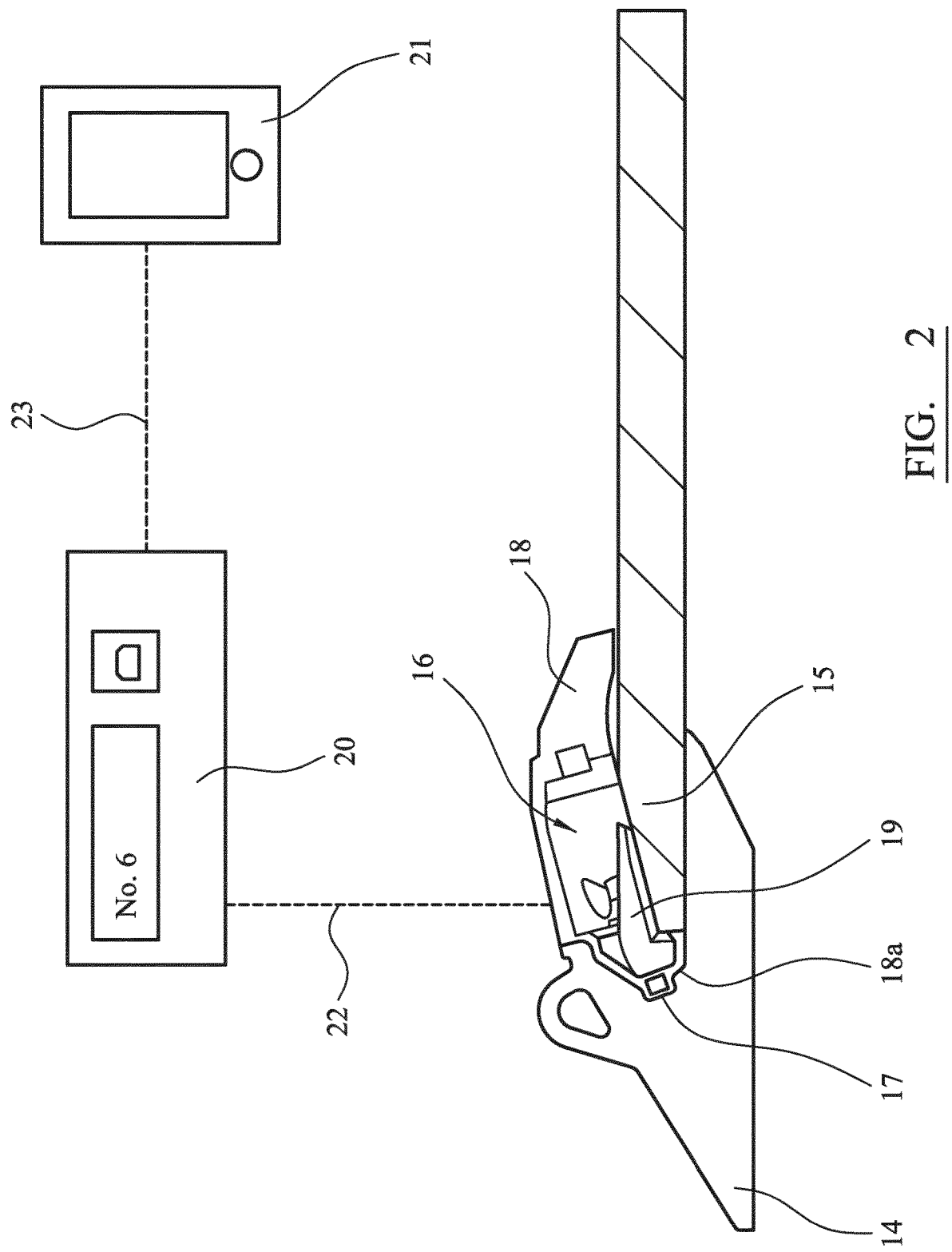
FIG. 2 is a schematic illustration of the mounting of a GET to the bucket lip of the underground loader of FIG. 1, the GET having an electronic RFID tag configured for wireless communication with an RFID activator according to a specific implementation of the present invention.

Referring to FIG. 2, the bucket lip 15 is formed at the leading edge of a generally plate-like base of bucket 13. Lip 15 is accordingly dimensioned so as to accommodate a set of GETs with each GET being detachably mounted at lip 15 via a releasable mechanical mounting. The mounting comprises a shroud indicated generally by reference 18 configured to at least partially envelope the lip (leading edge) 15 at the mount region of the GET. A boss 19 (formed from a weld component) is securely attached to lip 15 at the region of mounting of each GET. A lock pin assembly 16 is releasably mountable at/within shroud 18 to provide a mechanical lock for attachment of the GET 14 to the lip 15 via the cooperative engagement of the boss 19 according to the components and attachment mechanism described within WO 2014/037780 the contents of which are incorporated herein by reference. In particular, shroud 18 comprises an internal cavity 18a within which the lock and pin assembly 16 is mounted to abut against boss 19. An RFID tag 17 is secured to GET 14 by mounting internally within a forward region of shroud cavity 18a. According to the specific implementation, tag 17 comprises electronic components (as described with reference to FIGS. 4 and 5) and is bonded to the GET 14 via an encapsulating material. In particular, tag 17 is preferably encapsulated within the material that firstly acts as an adhesive to attach tag 17 to the forward region of shroud cavity 18a and secondly provides a moisture protective housing for tag 17.

The present system also comprises a portable electronic 'activator' 20 primarily configured to activate and configure the set of RFID tags 17 for operation according to the subject invention. Activator 20 (described further referring to FIGS. 7 and 8) is configured for wireless communication 22 with the RFID tags 17 in addition to separate wireless communication 23 with a portable computer or suitable electronic device such as a personal digital assistant (PDA) 21. As will be described in detail below, activator 20 and PDA 21 are configured to initially activate the tags 17 in situ within the working environment and in particular on initial installation and mounting of the GETs 14 at the bucket lip 15 prior to first use.

Figure 3:
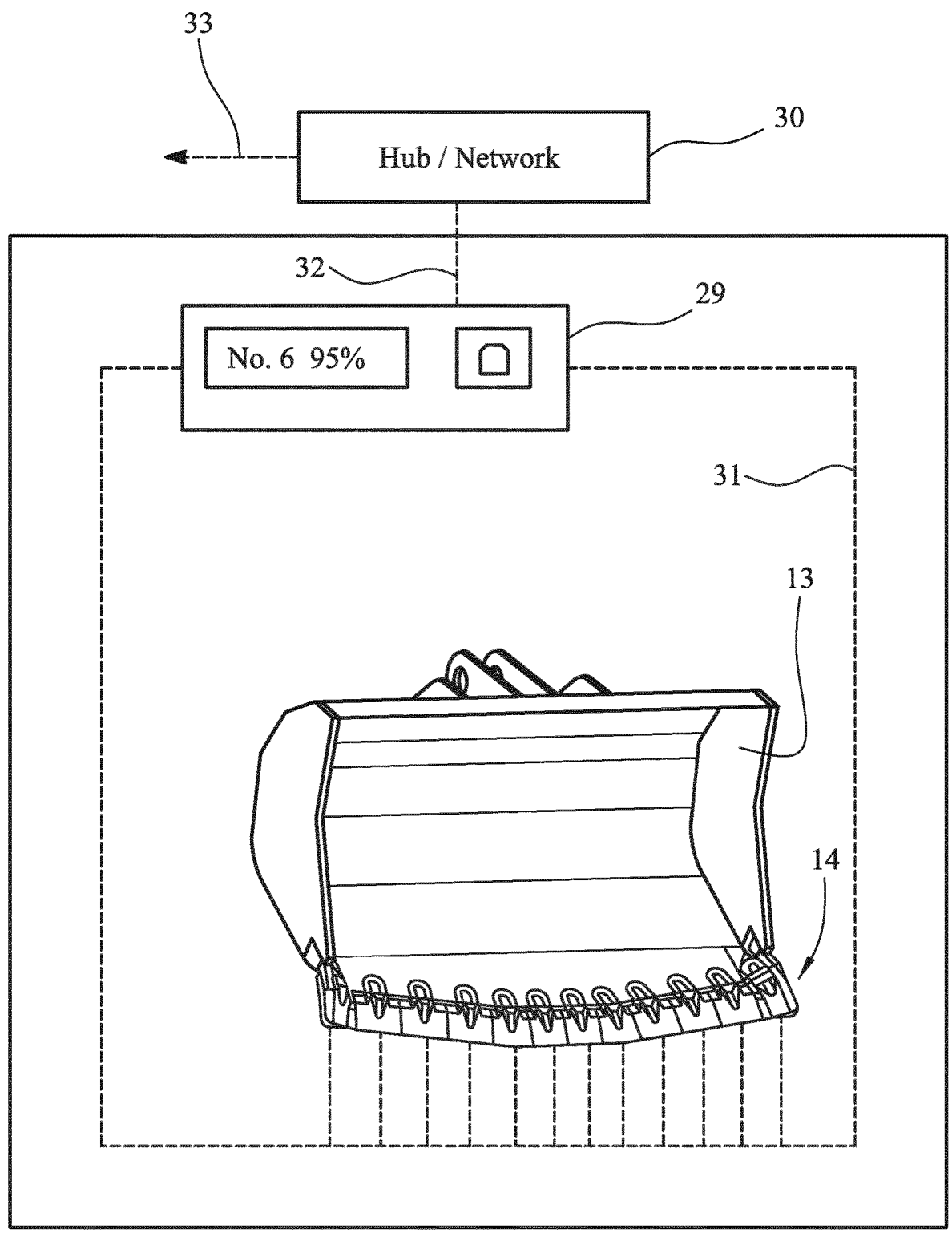
FIG. 3 is a schematic illustration of the wireless communication between a plurality of bucket mounted GETs of FIGS. 1 and 2 and an RFID receiver according to a specific implementation of the present invention.
Figure 9:
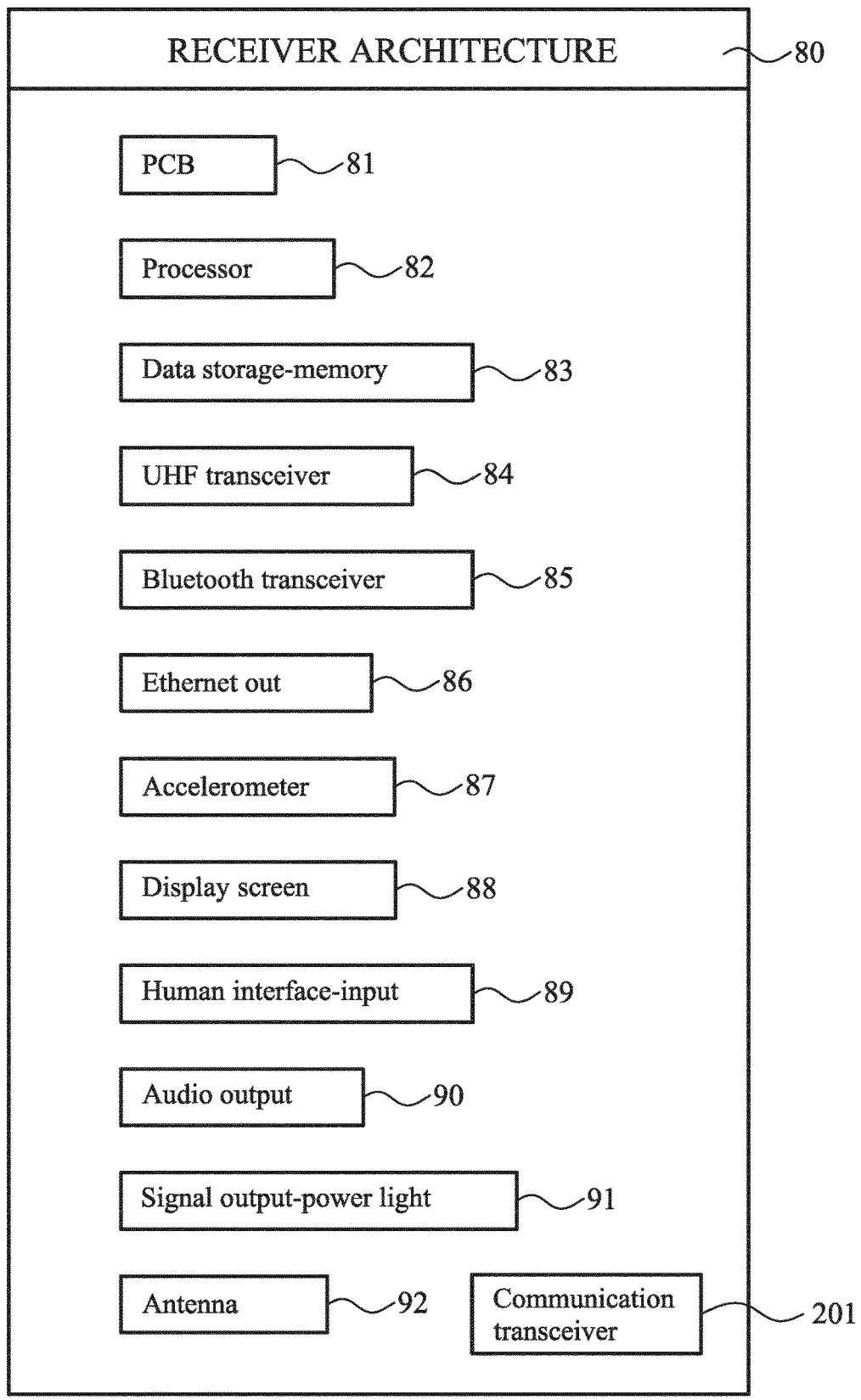
FIG. 9 is a schematic illustration of a receiver architecture.
Figure 10:
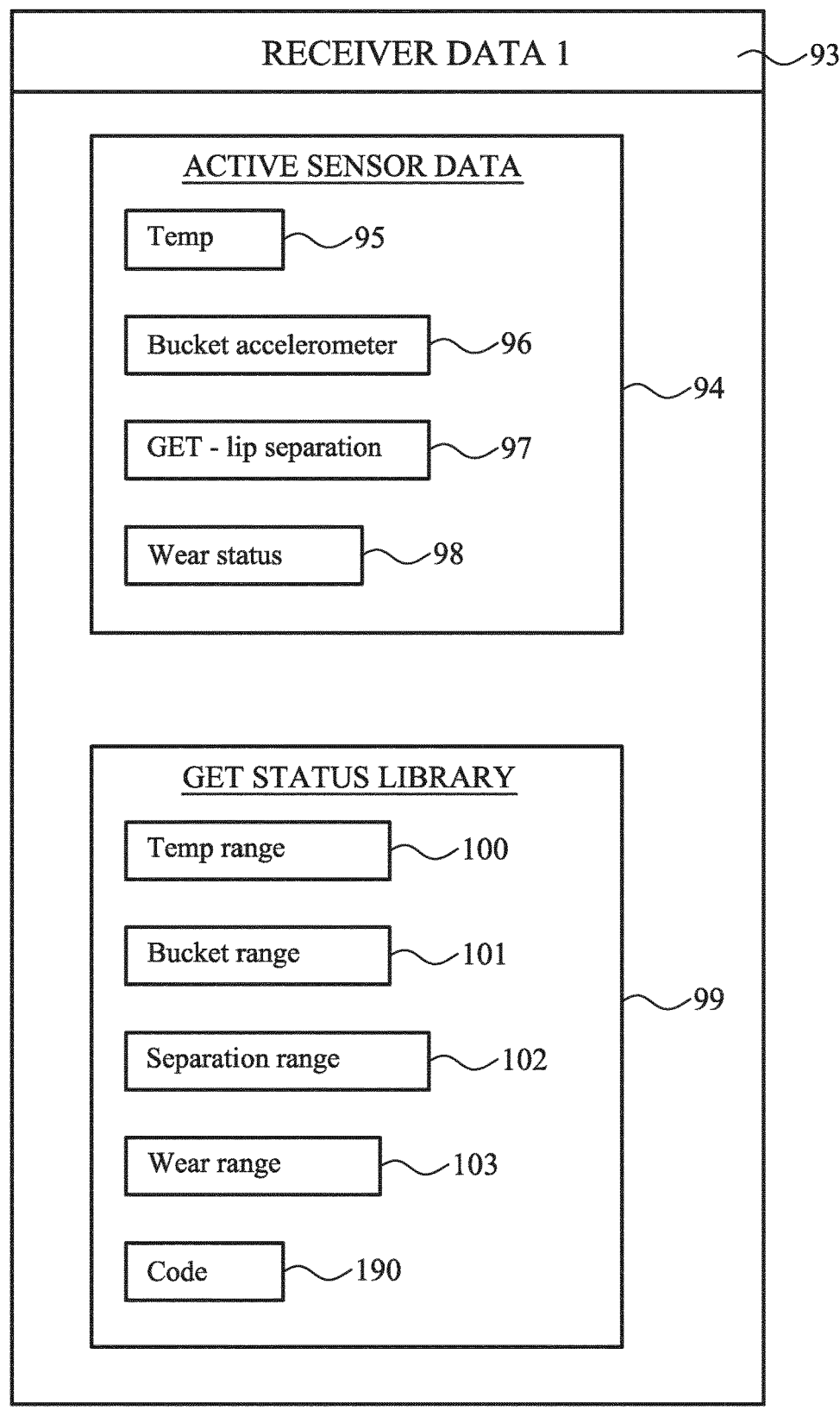
FIG. 10 is a first part of receiver data.
Figure 11:
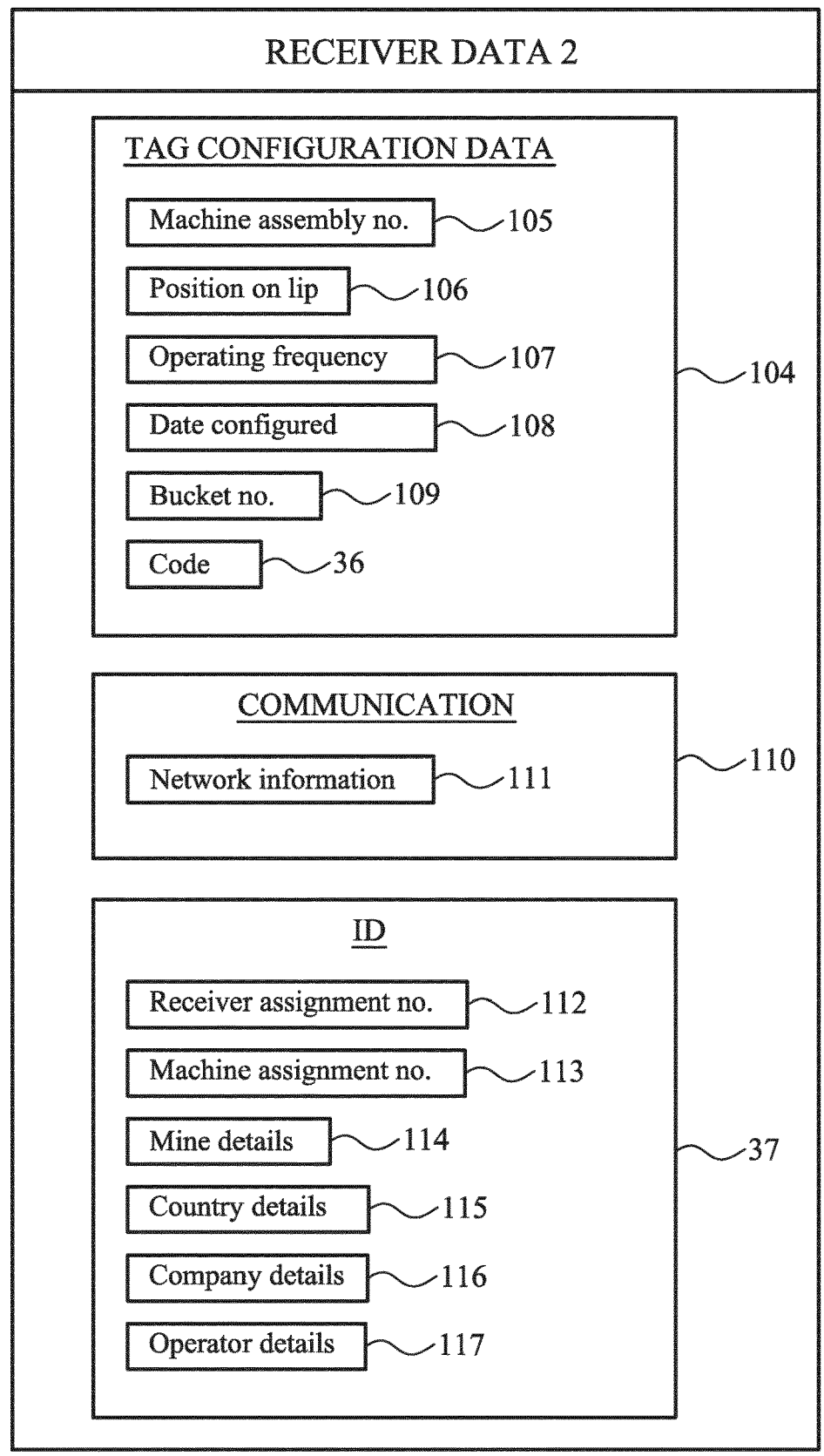
FIG. 11 is a second part of a receiver data.

Referring to FIG. 3, the subject invention may also be considered to comprise a receiver 29 also configured for wireless communication 31 independently with each of the bucket mounted GETs 14. Receiver 29 comprising the electronic components and function described further with reference to FIGS. 9, 10 and 11 is additionally adapted for coupled communication with a hub or network 30 so as to exchange GET related data with the hub/network 30. Any such uploaded data may then be configured for onward transmission 33 to one or a plurality of storage units or further data processing utilities (not shown) as will be appreciated.

Figure 4:
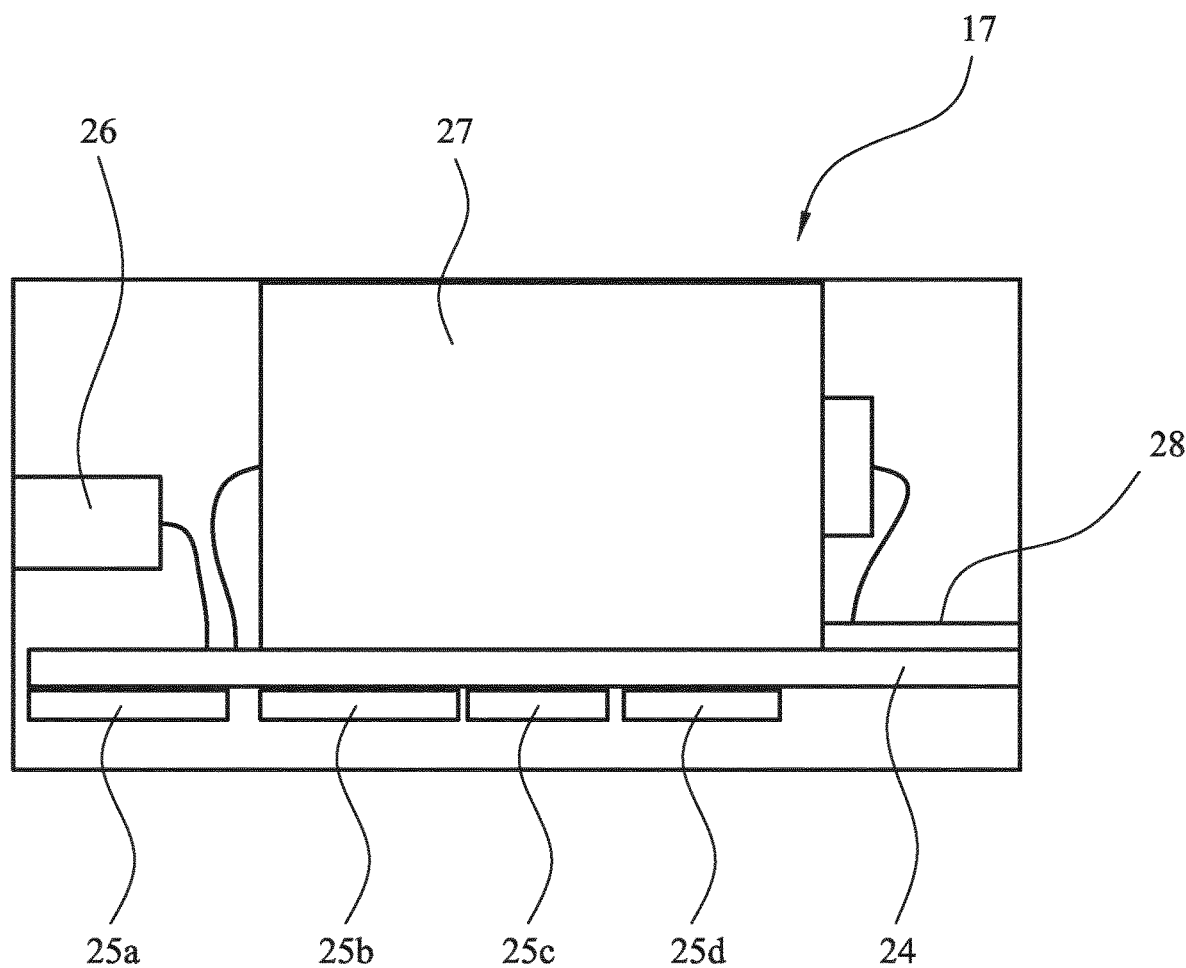
FIG. 4 is a schematic illustration of the RFID tag mounted at the GET of FIG. 2 according to a specific implementation of the present invention.
Figure 5:
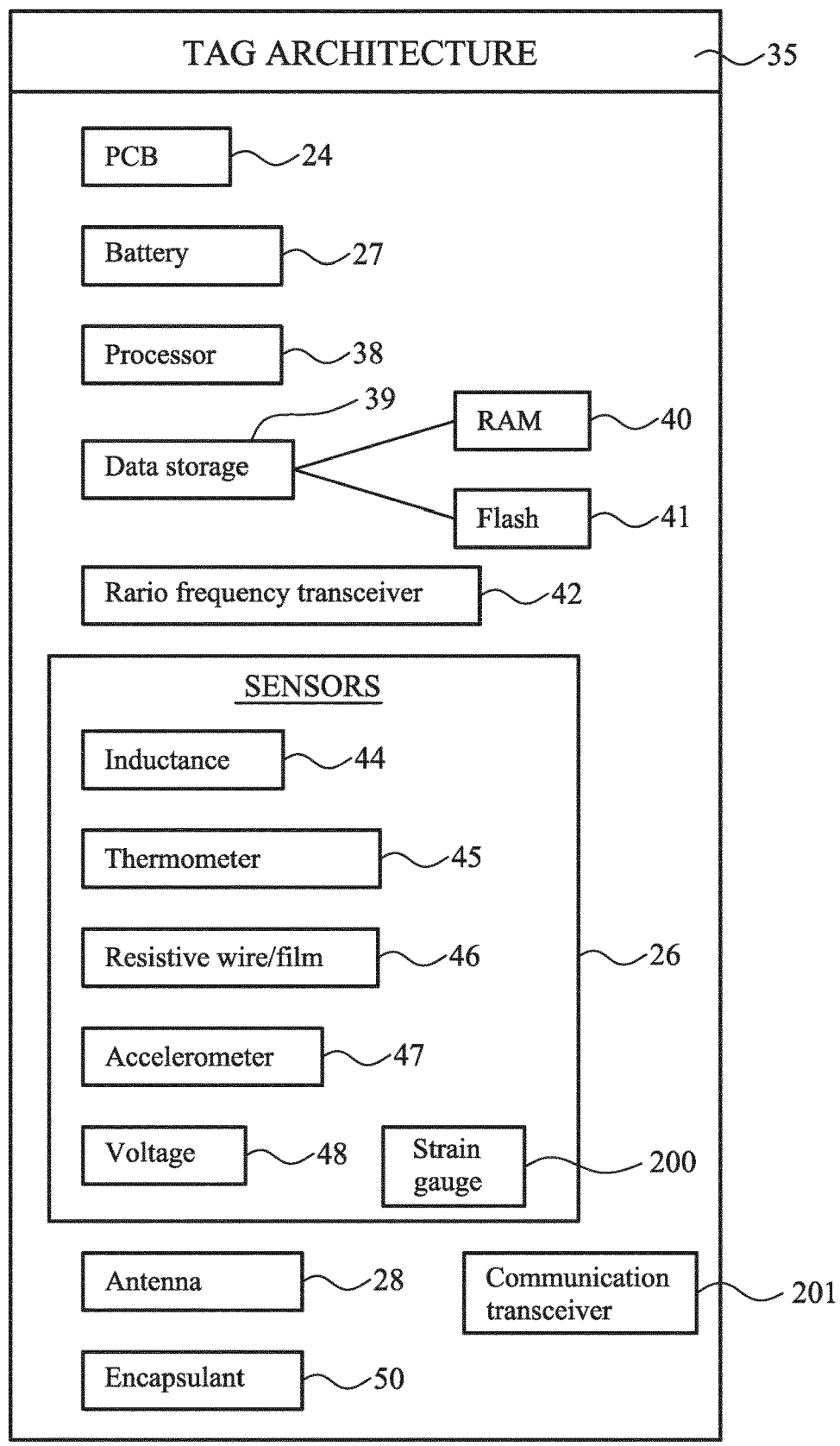
FIG. 5 is a schematic illustration of an RFID tag architecture.
Figure 6:
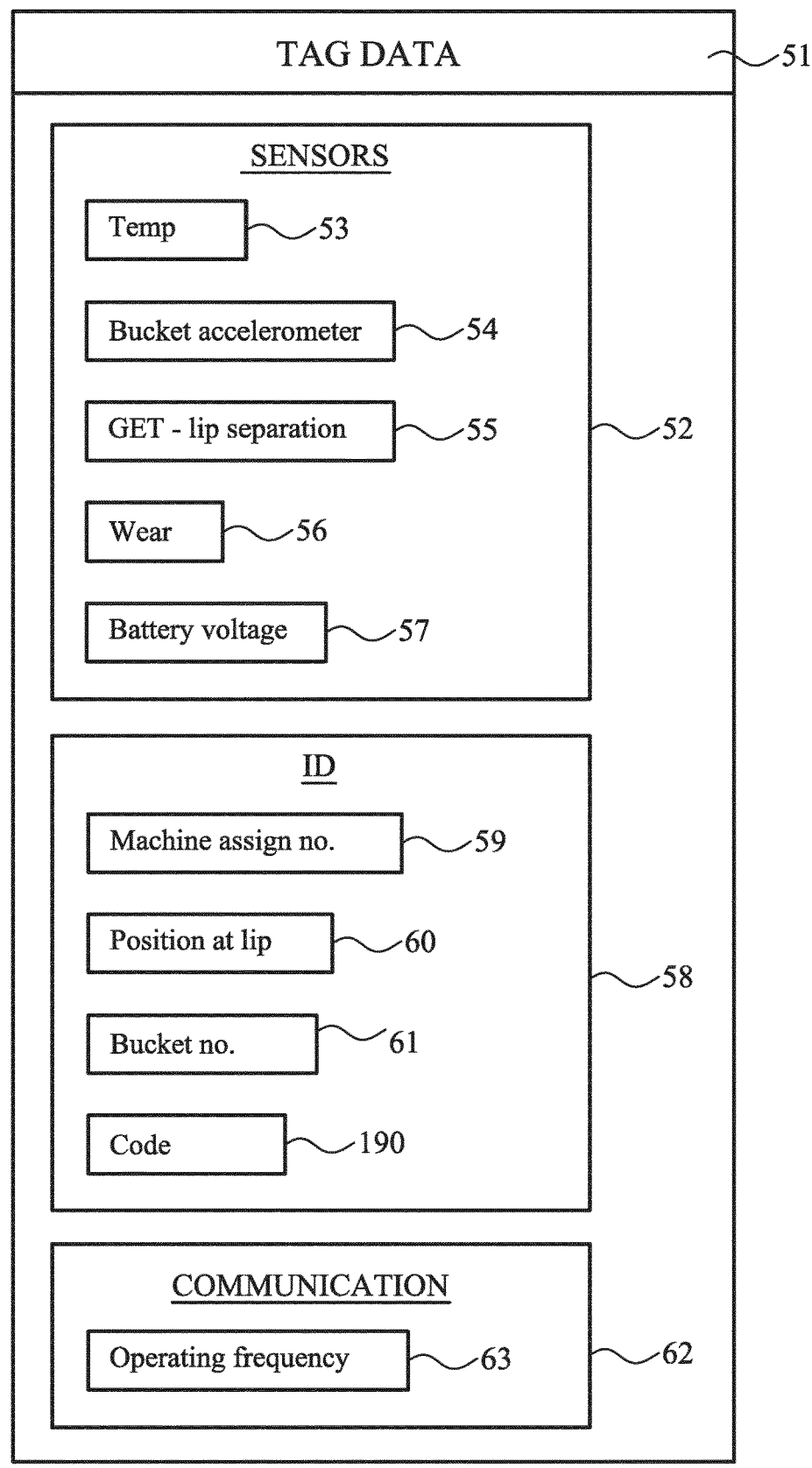
FIG. 6 is a schematic illustration of an RFID tag data.

Referring to FIGS. 4 and 5, each RFID tag 17 comprises a printed circuit board (PCB) 24 mounting a plurality of circuits 25a, b, c and d. PCB 24 further mounts a battery 27; an antenna 28; a microchip base processor 38; a radio frequency transceiver 42; and a suitable data storage 39 comprising RAM and flash memory 40, 41 respectively. Each tag 17 comprises a sensor unit 26 that includes a plurality of different types of sensor each configured for real-time status monitoring of the respective GET 14 and in particular the environment within which the GET 14 is located and is operative. In particular, sensor unit 26 comprises, according to the specific implementation, an inductance sensor 44, a thermometer 45, a resistance wire/film 46, an accelerometer 47, a voltage sensor 48 and a strain gauge 200. Optionally the tag architecture 35 may comprise an additional communication transceiver 201. The additional communication transceiver 201 may be configured for implementation with any additional communication types including any type of wireless communication not restricted to radio frequency and in particular UHF, VHF, Bluetooth etc. Similar additional or auxiliary communication transceivers 201 may be implementer as part of the activator architecture 64 and receiver architecture 18. The sensor unit 26 and in particular the electronic components 35 of the tag 17 are all encapsulated within a suitable silicone polymer based encapsulating material 50 (such as an epoxy) that both protects the components 35 and provides a means of attachment of the tag 17 to the GET 14.

Figure 12:
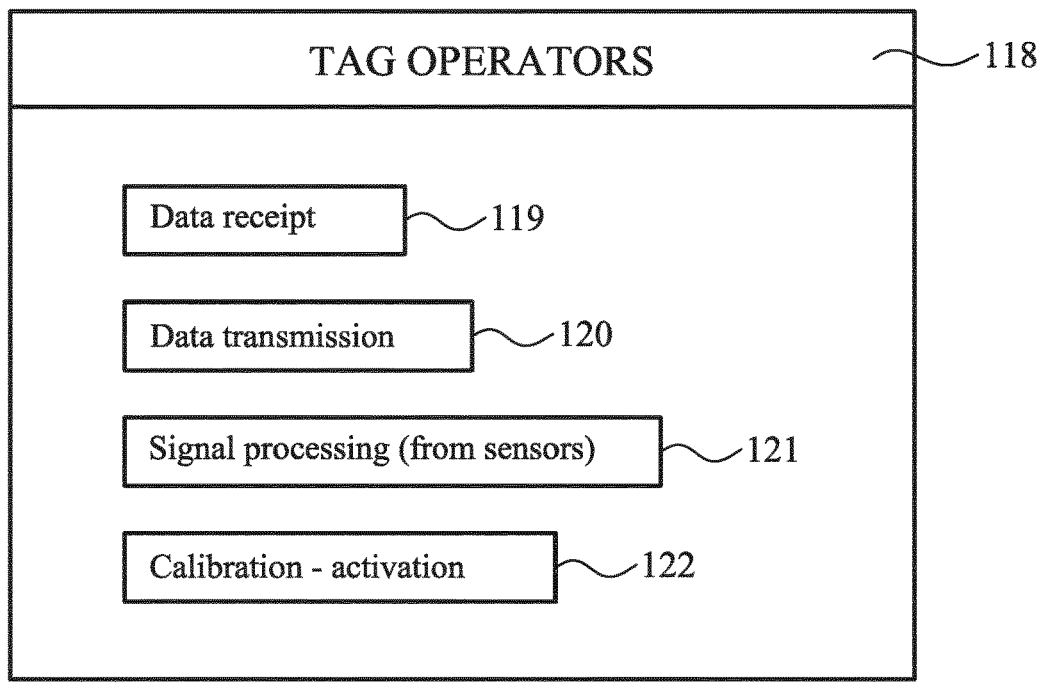
FIG. 12 is a schematic illustration of tag operators and activator operators.
Figure 12:
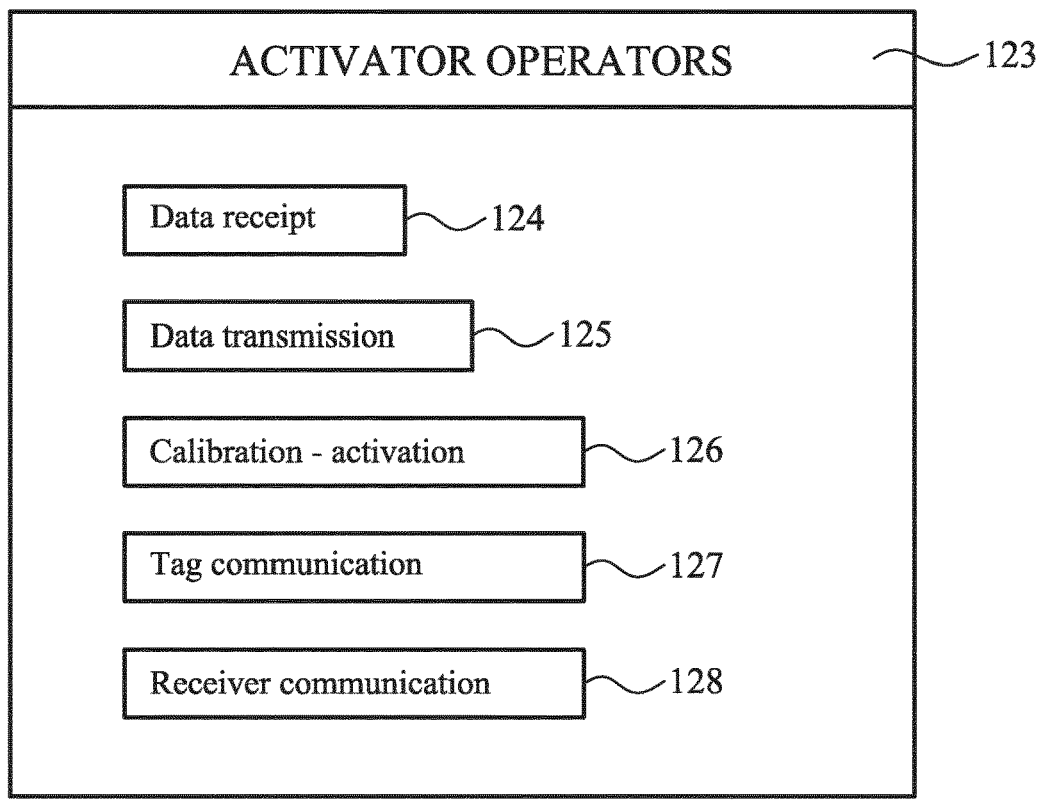
Figure 13:
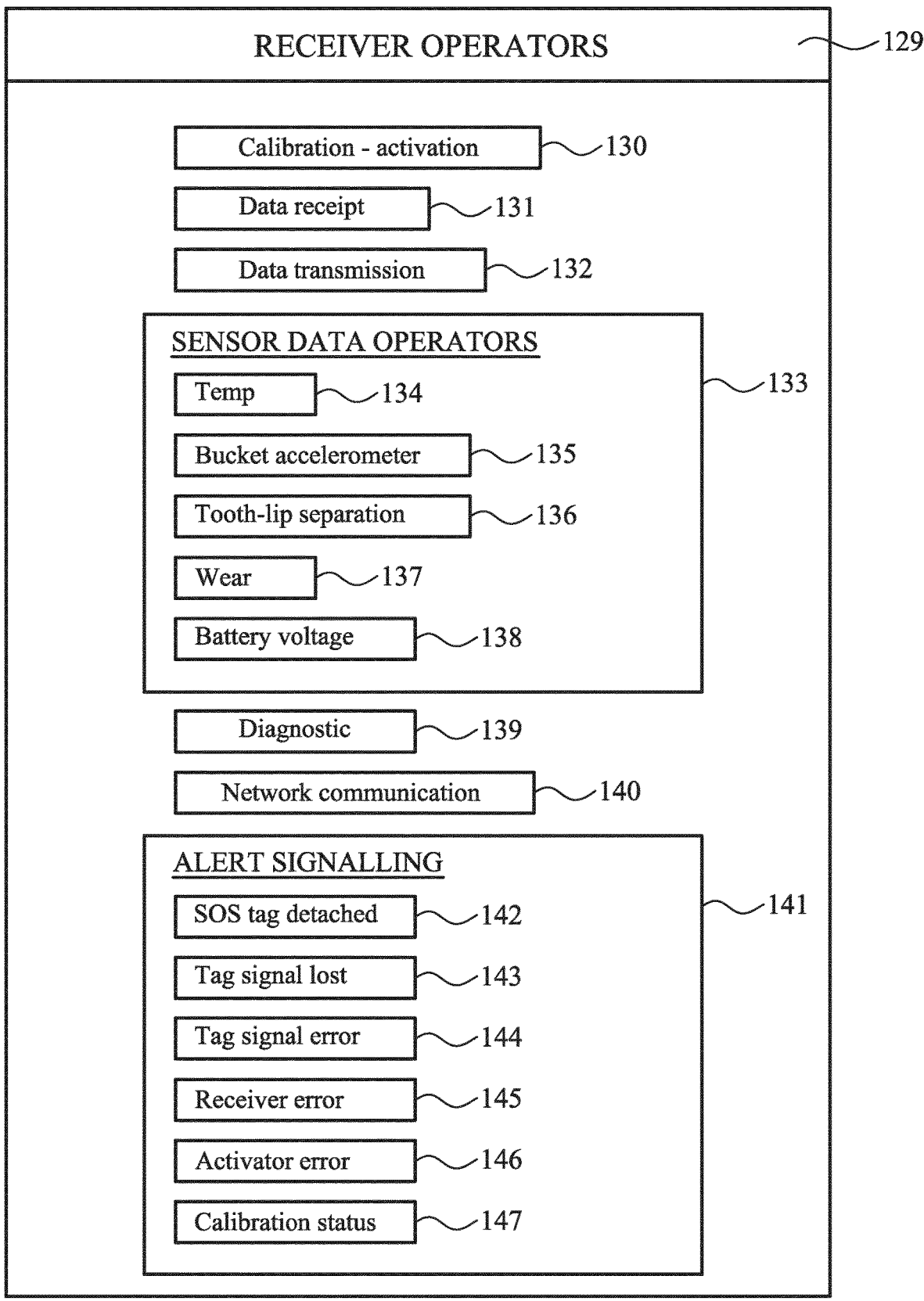
FIG. 13 is a schematic illustration of receiver operators.

Processor 38 may typically comprise a master processor in addition to a small power efficient processor (not shown) for initial activation of the master processor. Processor 38 is configured to run a suitable real-time operating system so as to provide tag operator functionality as described referring to FIG. 12 with the tag operators 118 implemented as software.

Referring to FIG. 5, voltage sensor 48 is configured to monitor the voltage at tag 17 and provide real-time monitoring of battery 27. Accelerometer 47 is configured to monitor a variety of different characteristics of bucket 13 (and optionally loader 10) including bucket movement generally and in particular a bucket elevation, horizontal/vertical motion, angular rotation and an acceleration/deceleration of bucket 13 including in particular bucket lip 15. Thermometer 45 accordingly provides temperature monitoring at the region of each GET 14. According to the specific implementation, the resistive wire/film sensor 46 is formed as a foil or rigid PCB attached to the main PCB board 24. Each GET 14 comprises a cast borehole (not shown) extending through the GET body and into the shroud cavity 18a. The resistive foil extends through the cast hole so as to protrude from an underside of the GET 14. The hole may be filed with an encapsulating resin such as an epoxy sealant so as to fix the resistive coil in place and to form a composite GET. Accordingly, as the GET 14 wears the length of the resistive foil is gradually decreased and a wear status monitoring of the GET 14 is provided.

The present GET status monitoring system according to the subject invention is specifically configured to monitor and output a status of mechanical attachment of each GET 14 at the bucket lip 15. In particular, via the sensor unit 26 and in particular inductance sensor 44, a GET-lip distance is capable of being monitored. In particular, via sensor 44, a separation distance between tag 17 and boss 19 is monitored continuously in real-time so as to output proximity data to receiver 29. Such a system, as will be described, is advantageous to identify progressive partial separation or loosening of a GET 14 at the bucket lip 15 during use and in particular prior to complete mechanical detachment of GET 14. According to the specific implementation, inductance sensor 44 is formed as a proximity sensor being a transducer operating according to the Hall effect in which an output voltage is varied in response to an induced magnetic field so as to provide the proximity sensing between tag 17 and the metallic boss 19 (for example formed by a weld component). As will be appreciated, inductance sensor 44 may be implemented as a variety of different types of sensor mountable at PCB 24 and configured to provide GET-to-bucket lip proximity data which is then capable of wireless transmission 31 to receiver 29 via the tag mounted radio frequency transceiver 42. Transceiver 42 is capable of operation within a broad frequency range typically ranging from 800 to 1000 MHz.

In use, each tag 17 via the electronic component 35 is associated with a plurality of different data sets 51 processable by processor 38 and stored at data storage 39, 40, 41. In particular, sensors 44 to 48 are configured to output GET-lip separation data 55, temperature data 53, wear data 56, bucket angle (and acceleration/deceleration) data 54 and battery voltage data 57, respectively with such data 53 to 57 being bucket sensor data 52. Each tag 17 via data storage 39, 40 and/or 41 is configured with GET and/or loader specific ID data 58. Such data 58 includes machine assignment number data 59 (being the assigned operating number of the low loader 10); position data 60 (being the position of a specific GET 14 at the lip 15 relative to other GETs 14 of the set mounted at the same loader 10) and bucket number data 61 (corresponding to the specific ID number assigned to the bucket 13 mounted at loader 10). The tag data 51 also comprises communication data 62 including in particular an operating frequency setting 63 being the designated operating frequency of a mine in which the loader 10 may be operative. At least some or all of the data sets 51 are capable of being communicated to and/or from tag 17 via wireless communication 22, 31 with the respective activator 20 and/or receiver 29.

Figure 7:
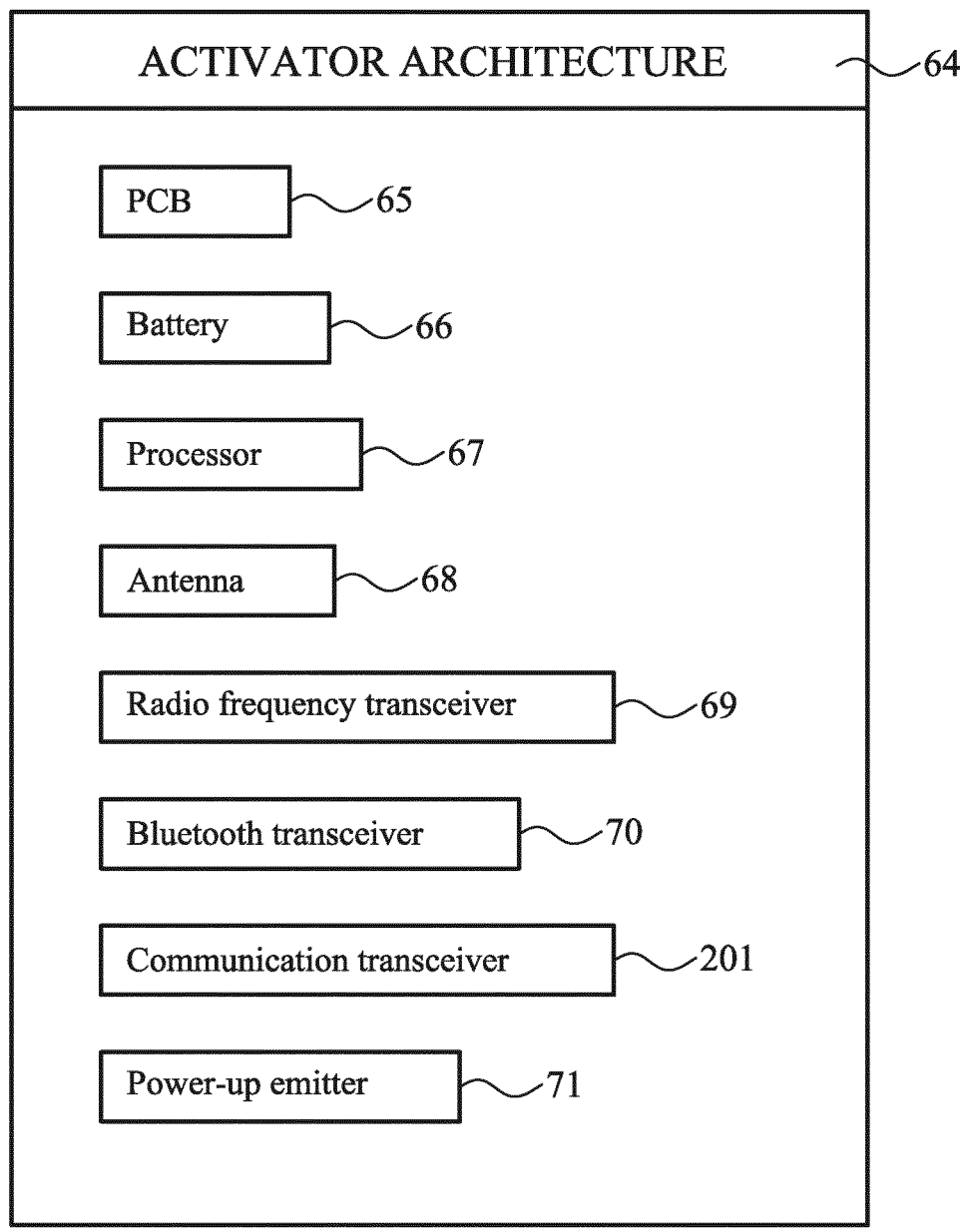
FIG. 7 is a schematic illustration of an activator architecture.
Figure 8:
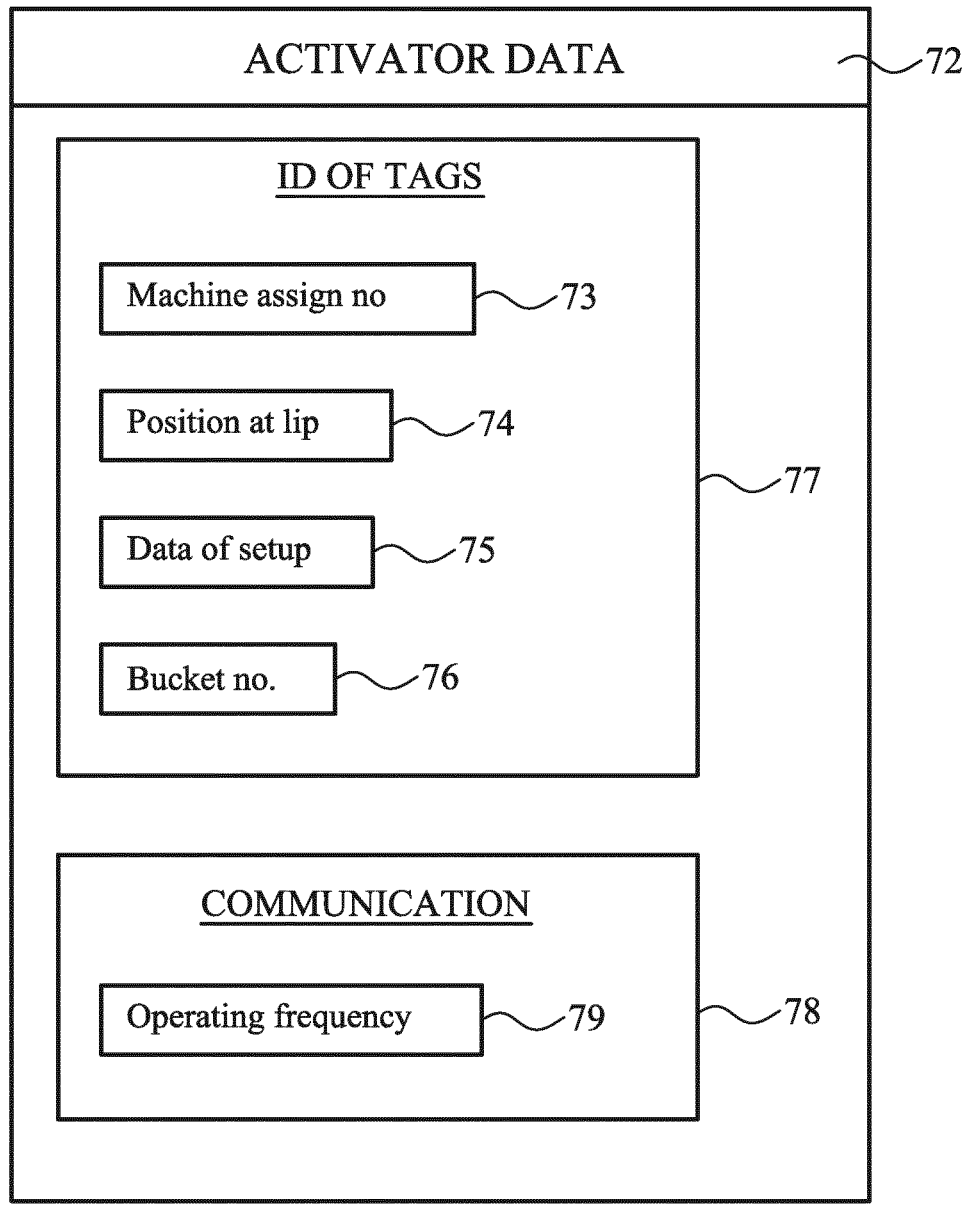
FIG. 8 is a schematic illustration of activator data.

Referring to FIG. 7, the portable activator 20 is implemented as a handheld device having electronic components 64 including in particular a PCB 65; a battery 66; a processor 67; an antenna 68; a radio frequency transceiver 69; a Bluetooth transceiver 70, a power-up emitter 71 and a communication transceiver 201. Activator 20 may also comprise a suitable display screen (not shown) for displaying information to user. Alternatively, activator 20 may not comprise a display (or output components) other than wireless or wired communication components to provide the desired communication pathways 22, 23 between tag 17 and PDA 21. Accordingly and referring to FIG. 8, activator 20 is configured for use with a plurality of activator data sets 72 including in particular tag ID data 77. Tag ID data 77 includes machine assignment number data 73; GET mounting position data 74; date of set-up data 75 and loader bucket number data 76. Activator data 72 further comprises communication data 78 including in particular a designated operating frequency data 79.

Referring to FIG. 9, receiver 29, configured for wireless communication 31, 32 with each GET 14 and a suitable hub/network 30 is implemented as a fixed-mounted or portable unit mountable within loader cab 11 and configured primarily for receiving sensor data 52 from GETs 14 in normal use. Receiver 29 is implemented via electronic component 80 including in particular a PCB 81, that mounts at least one processor 82; data storage utility 83; a UHF transceiver 84; a Bluetooth transceiver 85; an Ethernet out 86; an accelerometer 87, an antenna 92 and a communication transceiver 201. The receiver components 80 further comprise a visual display screen 88; human interface or input component 89 (such as a keyboard); an audio output 90 and a powered status indicator light 91. Receiver 29 via the electronic components 80 is adapted for operation with a variety of different data sets referred to herein as receiver data 93. Such receiver data 93 includes generally active sensor data 94; GET status library data 99; tag configuration data 104; communication data 110 and identification data 37 referring to FIGS. 10 and 11. In particular, the active sensor data includes temperature data 95; bracket acceleration/ deceleration and angle data 96; tooth-lip separation data 97; wear status data 98 with such data being generated by sensor unit 26 and received at receiver 29 via wireless communication pathway 31. The GET status library data set includes a temperature range data 100; bucket range data 101; separation range data 102 and wear range data 103. Such library data 99 may be loaded onto receiver 29 via communication pathway 32 so to enable on-board processing of the active sensor data 94 with reference to a corresponding library data set. Such library data 99 may be utilised to calculate and enable output reporting of the status of the GET at the lip 15 based on historic or desired performance parameters such as a desired operating temperature, bucket acceleration/deceleration; a GET-lip maximum separation threshold and a predefined wear characteristic or threshold to identify when a warn GET 14 requires replacement prior to an exceeded maximum wear limit.

Tag configuration data 104 includes machine assembly number data 105; GET position at lip data 106; operating frequency data 107; initial calibration or set up data 108 and assigned bucket number data 109. Such tag configuration data 104 is capable of being received from each tag 17 (at each respective GET 14) in parallel to the receipt of the active sensor data 94 so as to correlate sensor data 94 with a particular tag 17. In particular, code data 36 enables transmission and receipt of sensor data 94 at receiver 29 such that receiver 29 receives exclusively active sensor data 94 from the GETs 14 mounted at the lip 15 of appropriate loader mounted bucket 13. That is, signals from other GETs 14 mounted on different loaders 10 are effectively ignored by receiver 29 so as to provide a 'closed network' of communication 31 between the relevant GETs 14 mounted at the required 'local' bucket 13.

Communication data 110 includes in particular network information data 111 that is relevant for identifying receiver 29 within a hub/network 30 of multiple independent local networks formed by multiple mining machines (loaders 10) operating within the environment. The receiver ID data 37 includes receiver assignment number 112; machine assignment number data 113; mine related data 114; country related data 115; company related data 116; and operator related data 117. Such data sets 37 are used to identify the relevant receiver, machine etc., within a mining environment in addition to identifying the mine, country, company and machine operator within which a GET 14 is or has been operative within a larger network such as a company database containing information of heavy machinery in a large number of mines and operative environments across a plurality of countries.

As indicated, tag mounted processor 38 is configured to process tag data 51. Such processing is preferably implemented by software. The term 'operators' used herein encompasses software implemented routines and functionality with such operators being implemented by tag processor 38; activator processor 67 and receiver processor 82.

Tag operators 118 include software implemented for receiving tag data 119; transmitting sensor and other tag related data 120; processing signals from the sensors 121 and initial calibration and activation 122. Such operators function to control the data flow 22, 23 from the activator 20 through the tag 17 during initial set-up of a tag 17 immediately prior to use within a mine environment as described referring to FIG. 14. The operators 118 are also configured for the control of the processing of the data generated by sensor unit 26 and the onward transmission of data packets to the receiver 29 via communication pathway 31.

Similar software implemented operators 123 are associated with the activator 20 and include in particular data receipt 124; data transmission 125; calibration and activation 126; tag communication 127 and receiver communication 128. Such operators, as described with the tag operators 118 control transmission of data between the activator 20 and the respective tags 17 and PDA 21 in addition to the management of the various data sets 77 and 78 at the activator 20.

Corresponding software implemented operators 129 include receiver implemented software for controlling and processing receiver data 93 (data sets 94, 99, 104, 110 and 37). Such receiver operators 129 include in particular calibration and activation processing 130; data receipt 131; data transmission 132; sensor data operators 133 including in particular, operators 134, 135, 136, 137, 138 for processing of data relating to temperature, bucket status, GET-to-lip separation; GET wear and battery voltage, respectively. The receiver operators 129 further comprise diagnostic operators 139; network communication operators 140 and alert signalling operators 141. Alert signalling operators 141 include in particular, operators for alerting that a tag has been detached 142; a tag is lost 143; a tag includes a signal error 144; a receiver 29 is malfunctioning 145; an activator 20 is malfunctioning 146 and a calibration status 147 of the tags 17.

Figure 14:
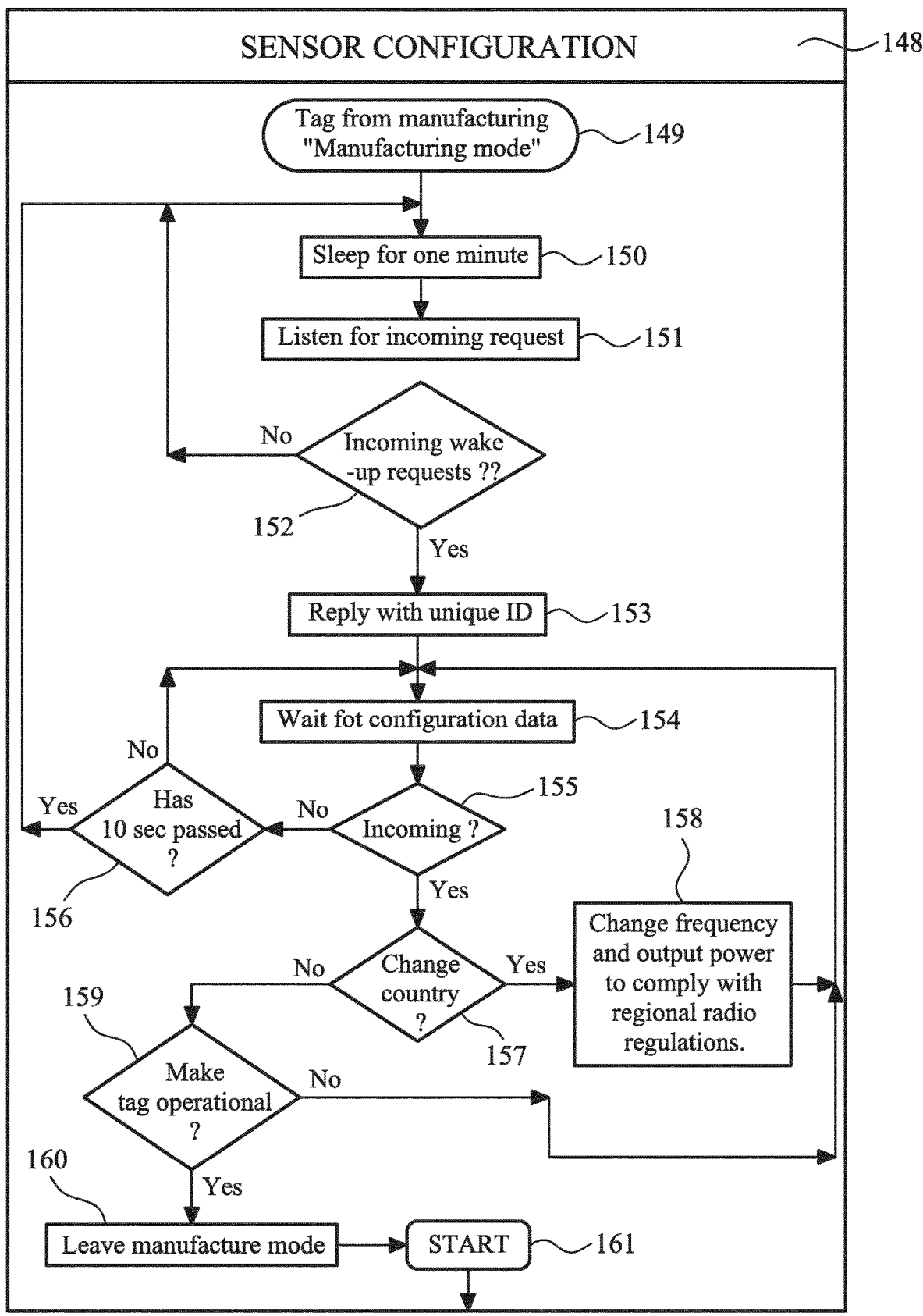
FIG. 14 is a flow diagram of an initial sensor configuration and operation according to a specific implementation of the present invention.

Via the architecture, data and operators as described referring to FIGS. 1 to 13, an initial configuration of the tags 17 may be performed and is described referring to FIG. 14. To facilitate transportation of the tags 17 bonded to a respective GET 14, the tags 14 are transported in a 'sleeping' or 'manufacturing' mode. Once a GET 14 is mounted at a bucket lip 15 on-site, the tag 17 requires processing through an activation process 148 and in particular configuration or operation within the designated mining environment and in particular when attached to a particular bucket 13 of a specific piece of heavy machinery 10. At step 149, tag 17 is installed at lip 15 in its 'manufacturing' mode. Tag 17 is configured to 'sleep' for one minute at stage 150 and to 'listen' for transmission from activator 20. Tag 17 and activator 20 are configured for UHF or Bluetooth communication via the respective transceivers 42 and 69. Accordingly communication pathway 22 is initiated and maintained so as to allow download of information from activator 20 to each of tags 17 at the lip 15. If no activation signal is received at stage 152, stages 150 and 151 are cycled. If a signal is received, tag 17 responds with a unique ID at stage 153. The tag 17 then waits for configuration data at stage 154. At stage 155, if no configuration data is received after ten seconds (stage 156) tag 17 continues to wait and stage 154 is repeated. If configuration data is received at stage 155, processing of the data exchanged initiates (stage 157) including in particular the setting of the tag ID data 58 including in particular changing the frequency range at stage 158. Once the data exchange is complete, the activator 20 via operators 123 continues to stage 159 to confirm tag 17 as fully operational. Once fully operational, the tag 17 exits manufacturing mode at stage 160 and is capable of beginning sensor data transmission at stage 161. The tag initial configuration data may be selected and customised via user input at PDA 21 for communication to the activator 20 via pathway 23. As will be appreciated, the operating power of the activator 20 and in particular the transmission strength from the activator 20 may be regulated so as to control and in particular to restrict the localised transmission of data from activator 20 to a target tag 17 at the bucket lip 15.

Once the initial calibration of each tag 17 is complete according to stages 149 to 161, activator 20 is generally inactive as part of the real-time GET status monitoring. However, activator 20 may be used subsequently for diagnostic investigation and in particular to confirm a functioning status of a tag 17 should there be any error with data transmission for example.

A normal operating processing according to the subject invention will now be described referring to FIG. 15. In particular, the normal operating process 162 involves RFID tag 17 transmitting sensor data at stage 163. Such data includes sensor data 52 including in particular data relating to the proximity or linear separation of tag 17 relative to weld component 19; the temperature at tag 17; a wear status of the GET (based on a volume of resistive wire/film present within the GET 14); an acceleration/deceleration and angle of the bucket lip 15 in use and a voltage at the tag 17. Such data transmission 163 occurs in real-time and is received at receiver 29 at stage 164. Receiver 29 also receives the tag ID data 58 in parallel to the sensor data 52. Receiver mounted processor 82 is then configured to process the received sensor data 52 at stage 165. Information based on the processed sensor data may then be output at stage 166 via the receiver mounted display screen 88.

Additionally, such processed sensor data is also capable of being stored at the receiver storage utility 83 at stage 167. At stage 168, the processed sensor data may also be output to hub/network 30 via wireless communication pathway 32 for subsequent onward transmission 33 or processing referring to FIG. 3. As noted in FIG. 15, the raw data from tag 17 may also be stored at receiver data storage utility 83 without receiver processing.

Accordingly, 'live' proximity data is capable of being transmitted and received between tag 17 and receiver 29 with this information being displayed at the machine cab 11. Accordingly, an operator is fed real-time GET status information. In the event that a GET 14 appears to becoming loose, action may be taken prior to complete mechanical detachment and undesirable loss of a GET 14 from a mounted position at bucket 13. Via the receiver held GET status library 99, a GET status check can be performed at stage 169 so as to confirm that a GET 14 has not warn beyond threshold limits or has not become loose beyond a predetermined threshold. Accordingly, at stage 170, the operating status of the GET is assessed. If any physical or mechanical characteristic that is being monitored by sensor unit 26 is outside of a desired range, an alert signal is generated at stage 171. Such an alert signal may be local at the receiver 29 via display screen 88, audio output 90 and/or status indicator light 91. Alternatively and in addition, an alert signal may be transmitted to hub/network 30. If a sensor is outputting data within a desired range, the sensing operation continues at stage 172. The transmission, receipt and processing of data and information through stages 163 to 172 is primarily localised between the bucket mounted tags 17 and the receiver 29 located at loader 10. Via the transmission of the ID data and in particular code data 190, 36, data from tags 17 mounted on other mobile units 10 is effectively ignored. That way, an operator of the specific loader 10 is notified exclusively of the status of attachment, wear status, the temperature etc., of those GETs 14 at the loader specific bucket 13.

However, the present local-network GET status monitoring is capable of being extended beyond individual and independent mobile processing machines 10. In particular, and referring to FIG. 16, the GET status monitoring system is configured to generate alerts 173 during normal operation 162 as described referring to alert signalling step 171. In particular, should a GET 14 become detached from its mounted position at the lip 15 as illustrated in FIG. 2, the alert sequence is initiated at stage 174 by receiver 29. This process of alter signalling 173 involves interrogation of the library data 99 via sensor and/or alert operators 133 and 141. If an RFID tag status is within the various different desired operating ranges via a status check at stage 178, normal operation is followed via stage 179 corresponding to the operating procedure 162 detailed in FIG. 15. If a GET (via its respective tag 17) is identified as having sensor parameters outside of a predetermined operating range, the alert sequence is activated via an initial confirmatory check (stage 175). Confirmation of detachment at stage 176 may be achieved exclusively via the output proximity sensor data 55, 97 or in combination with the accelerometer sensor data 54, 96 of each GET 14 of the same bucket 13 i.e., were a particular detached GET 14 is identified as stationary whilst the remainder of the set of GETs attached to the same bucket 13 are identified as mobile. Such a situation would initiate generation of an SOS signal at stage 177. According to the specific implementation, a detached GET 14 is configured to generate the SOS signal at stage 177 (based on an exceeded proximity threshold value). All multiple independent receivers 29 (mounted within neighbouring loaders 10 operative in the same working environment) are programed to listen for an SOS signal. This tag-generated SOS signal or code will also include broadcast of tag ID data 55 including in particular machine assignment number ID data 59 so as to identify the loader 10 from which the GET 14 is detached.

Optionally, according to a further specific implementation, the receiver 29 may be configured to generate the SOS signal. As part of this, receiver 29 enables multiple independent receivers 29 (mounted within neighbouring loaders 10) to be configured to receive data from the detached GET 14. Stage 180 for example comprises transmission of code data 190 and 36 to the neighbouring receivers 29 within the local environment. All cab mounted receivers 29 are then enabled to continually scan and receive data from a tag 17 of a detached GET 14 transmitting an SOS signal.

Optionally, the SOS signal may be based on sensor data 52 that is outside of a predefined range (or beyond a threshold value) as would be expected from a 'detached' GET. For example, such an SOS signal could be based on the accelerometer data 54 in that a detached GET will be stationary. Such data transmission may be clarified by corresponding inductance data 55 where the separation between tag 17 and boss 19 has exceeded the threshold indicating detachment.

Once location of a lost GET has been identified at stage 181 (for example by a neighbouring loader 10) an output signal is generated at stage 182. In response to the output signal 182, the tag generated SOS signal is stopped at stage 184. In one implementation, this may be achieved by manually attaching a steel block or bar to the inside face of a GET 14 once recovered, that would in turn change the environment of the inductance sensor 44 and in turn effectively deactivate the SOS signal at stage 183. According to a further variation, the activator 20 may be operated to disarm the tag 17 and terminate the SOS signal.

Figure 15:
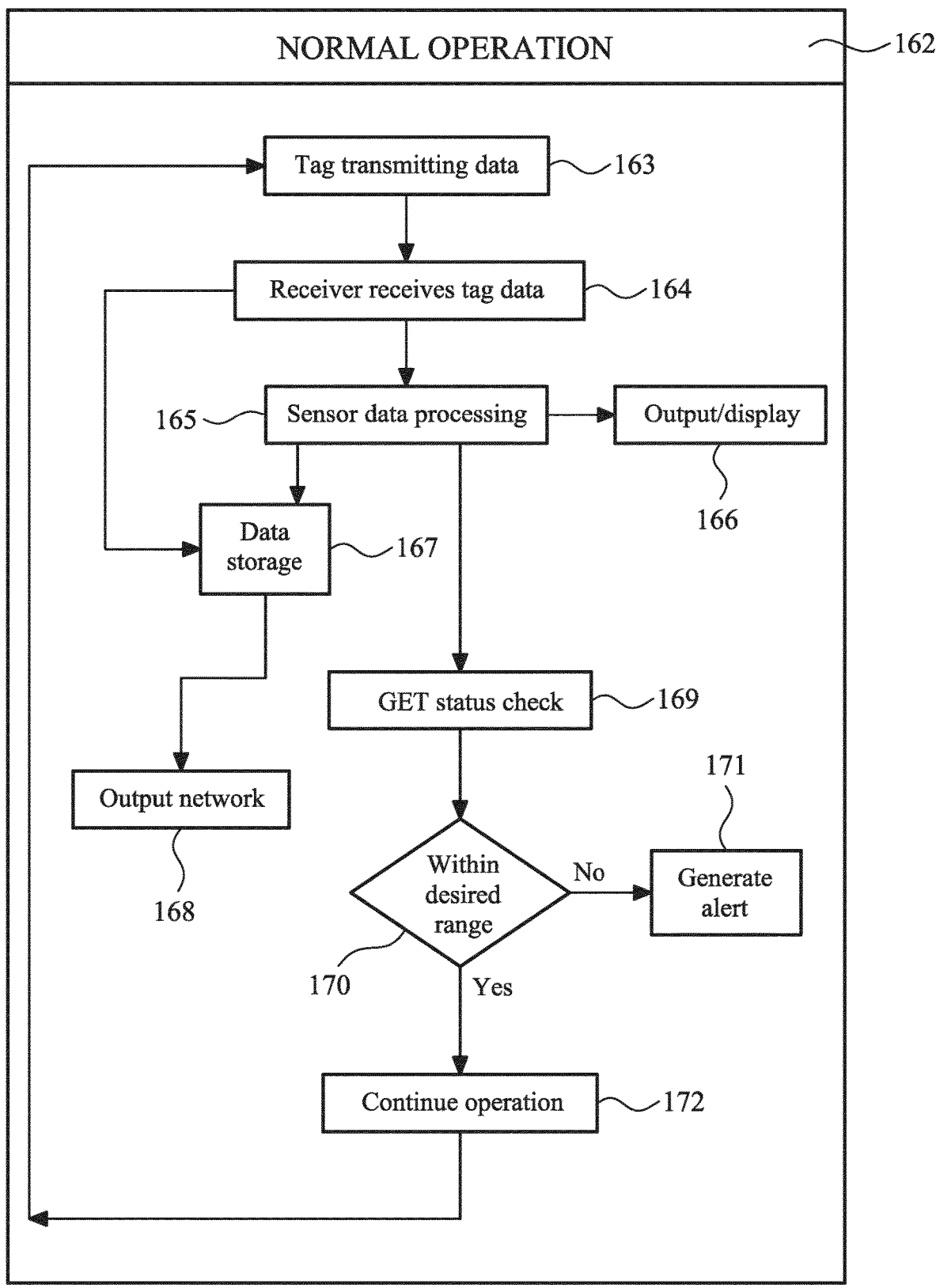
FIG. 15 is a flow diagram of a normal operation of a GET status monitoring system according to one aspect of the present invention.
Figure 16:
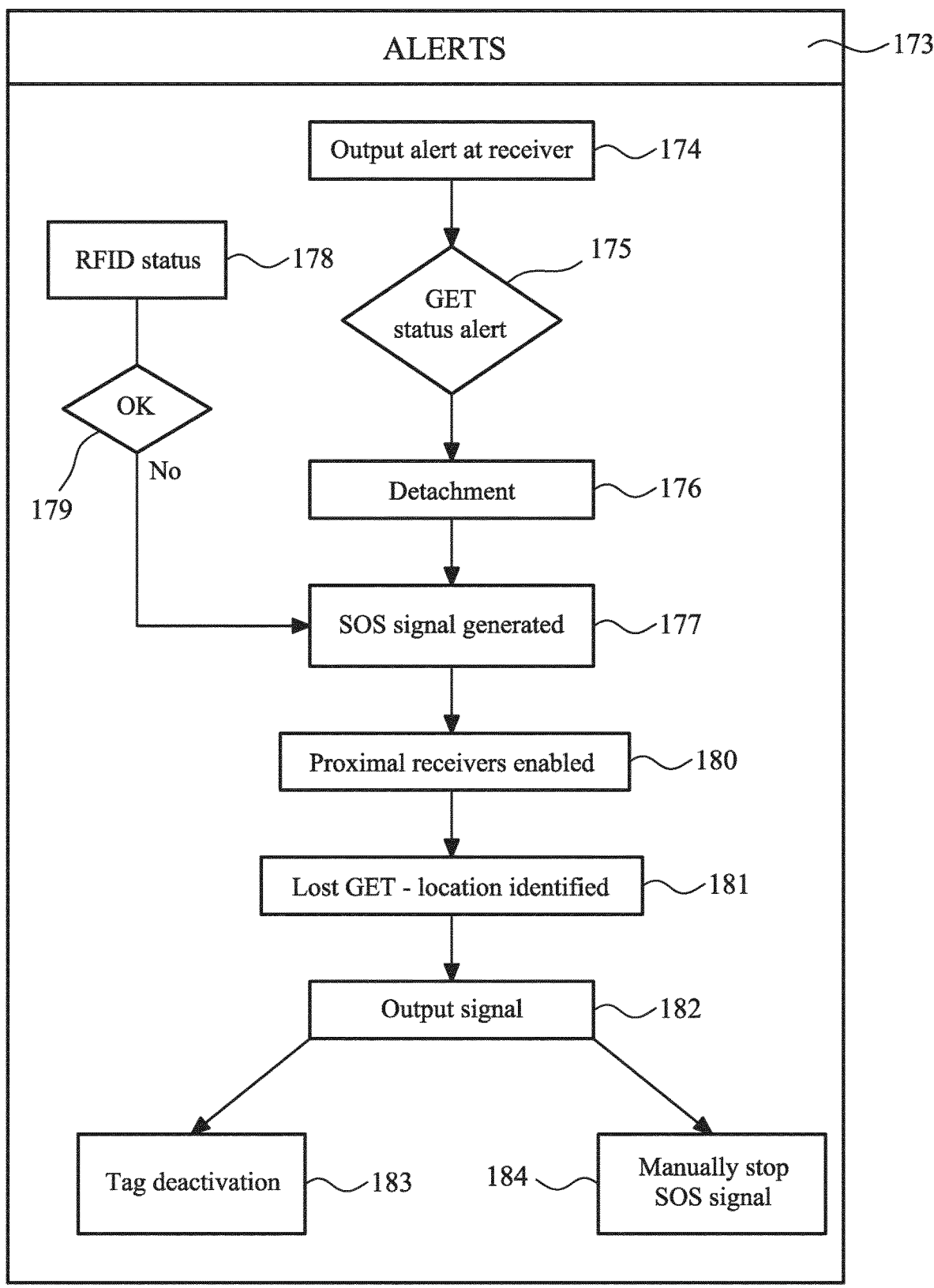
FIG. 16 is a flow diagram of one aspect of the present invention to provide alerts in the event of a detachment of a GET at a bucket as illustrated in FIGS. 1 and 3.

Accordingly, the subject invention as described referring to FIGS. 15 and 16 is capable of the active status monitoring of a GET at heavy machinery 10. In particular, the subject invention provides status monitoring in real-time (of the order of multiple sensing events per millisecond, second or minute) to output to a remote device an active attachment status of a GET. The present invention provides a system for the local monitoring of the status of a plurality of GETs (for example at a bucket) with such a local network being compatible for use within a large operating environment that would typically contain a plurality of local operating networks associated with each independent mobile mining machine (for example low loader 10). The present invention also provides a system configured for SOS alert signalling such that the local networks may be extended so as to be 'open' in that a signal from a detached GET may be identified by a multiple devices and receivers within a mining environment outside of the initial local network configuration of the particular lost GET. The subject invention is advantageously implemented via RFID tag technology with such signal transmission being adaptable to suit different operating environments and in particular operational frequency ranges and to configure internal register settings and software function dependent upon regulations of the country and/or mine in which a GET is operative.

The invention claimed is:

1. A monitoring system for monitoring a status of attachment of a ground engaging tool at a mining, earth moving or rock processing machine, the system comprising:
   at least one ground engaging tool detachably mountable at a mount region of a mining, earth moving or rock processing machine;
   at least one proximity sensor provided at the ground engaging tool and configured to sense a proximity of the ground engaging tool relative to the mount region of the mining, earth moving or rock processing machine to which the ground engaging tool is mountable, wherein the ground engaging tool includes an electronic tag, the proximity sensor being provided at the tag;
   a transmitter provided at the ground engaging tool to transmit wirelessly proximity data to a receiver located remote from the ground engaging tool; and
   an activator having a printed circuit board, a processor and a transceiver, the activator configured for wireless communication with the electronic tag.

2. The system as claimed in claim 1, wherein the ground engaging tool includes a first part of a mechanical connection and the mount region includes a second part of the mechanical connection, the ground engaging tool being arranged to be detachably mounted at the mount region via a mating of the first part and the second part.

3. The system as claimed in claim 1, wherein the proximity sensor includes any one or a combination of the following: an inductor component; a capacitor component; and a proximity sensor component.

4. The system as claimed in claim 1, wherein the tag includes any one or a combination of the following: a printed circuit board; a processor; a data storage utility; a transceiver; and an antenna.

5. The system as claimed in claim 4, wherein the transceiver includes a radio frequency transceiver and/or a Bluetooth transceiver.

6. The system as claimed in claim 1, wherein the electronic tag is encapsulated within a housing or encapsulating material.

7. The system as claimed in claim 1, wherein the receiver includes a printed circuit board, a processor, a transceiver and a data storage utility.

8. The system as claimed in claim 7, wherein the receiver includes a user interface having a display screen to output the proximity data or information based on the proximity data.

9. The system as claimed in claim 1, wherein the mount region is a leading edge of an excavation bucket of an earth moving machine.

10. The system as claimed in claim 1, wherein the ground engaging tool includes any one or a combination of the following: a temperature sensor; a ground engaging tool wear status sensor; an accelerometer; and a voltage sensor.

11. A method of monitoring a status of attachment of a ground engaging tool at a mining, earth moving or rock processing machine, the method comprising:
   providing a proximity sensor at a ground engaging tool detachably mountable at the mining, earth moving or rock processing machine, wherein the proximity sensor is provided at an electronic tag that is mounted to the ground engaging tool;
   sensing a proximity of the ground engaging tool relative to a mount region of the mining, earth moving or rock processing machine to which the ground engaging tool is mounted;

transmitting wirelessly proximity data generated by the sensor to a receiver located remote from the ground engaging tool; and storing, outputting and/or processing the proximity data at the receiver to monitor an attachment status of the ground engaging tool based on the proximity data, wherein the electronic tag is configured to transmit tag ID data to the receiver such that the electronic tag and the receiver are communication paired, wherein in a normal use mode, the receiver accepts exclusively transmission of proximity data from the electronic tag associated with the mining, earth moving or rock processing machine and not from non-associated electronic tags on different mining, earth moving or rock processing machines.

12. The method as claimed in claim 11, further comprising outputting at the receiver the proximity data or information based on the proximity data.

13. The method as claimed in claim 11, wherein prior to generating the proximity data, the method further comprises activating the electronic tag using an activator configured for wireless communication with the electronic tag.

14. The method as claimed in claim 13, wherein the wireless communication between the activator and the electronic tag is a radio frequency or Bluetooth communication.

15. The method as claimed in claim 13, wherein the step of activating the electronic tag includes transferring activation data to the electronic tag, the activation data comprising any one or a combination of the following: ID data relating to the ground engaging tool, the environment within which the ground engaging tool is to be operative and/or the machine to which the ground engaging tool is mountable; a position of the ground engaging tool at the machine to which the ground engaging tool is mounted; communication parameter data to enable the electronic tag to communicate with the receiver; and configuration data to set a working configuration of the electronic tag.

16. The method as claimed in claim 11, further comprising providing at the ground engaging tool any one or a combination of the following: a temperature sensor; a ground engaging tool wear status sensor; an accelerometer; and a voltage sensor; and sensing at the ground engaging tool and transmitting to the receiver any one or a combination of the following: a temperature of the ground engaging tool; a wear status of the ground engaging tool; an inclination/declination of the ground engaging tool; movement in a horizontal/vertical plane of the ground engaging tool; an acceleration/deceleration of the ground engaging tool; a tilt angle of the ground engaging tool; a strain or stress at the ground engaging tool; an impact status of the ground engaging tool; and a voltage at any one or a combination of the sensors.

17. The method as claimed in claim 11, further comprising outputting the proximity data or information based on the proximity data to a network or data storage utility via wired or wireless communication.

18. The method as claimed in claim 11, wherein in response to a mechanical detachment of the ground engaging tool from the mount region, the receiver being configured to transmit to at least one neighbouring receivers in the same working environment a signal to enable the neighbouring receivers to receive and process a signal transmitted from the ground engaging tool that is detached.

19. The method as claimed in claim 18, wherein the neighbouring receivers are configured to communicate with the receiver of the machine from which the ground engaging tool has been detached and to notify the receiver when a signal has been received from the detached ground engaging tool.

20. A ground engaging tool mountable at a mining, earth moving or rock processing machine, the ground engaging tool comprising:
a main body having a ground engaging region to engage the ground and an attachment region to attach the ground engaging tool at a mining, earth moving or rock processing machine; an RFID tag attached to the ground engaging tool, the RFID tag comprising:
a printed circuit board;
a processor;
an antenna;
a battery; and
at least one sensor including a proximity sensor arranged to sense a proximity of the ground engaging tool relative to a region of the mining, earth moving or rock processing machine to which the ground engaging tool is mountable, wherein the RFID tag is configured to be activated wirelessly using an activator configured for wireless communication with the RFID tag.

* * * * *